United States Patent
Korkalo

(10) Patent No.: US 10,298,467 B2
(45) Date of Patent: May 21, 2019

(54) METHODS AND SYSTEMS FOR CONFIGURING COMMUNICATION NETWORKS

(71) Applicant: RRC Networks Oy, Oulu (FI)

(72) Inventor: Mikko Tuomas Korkalo, Muhos (FI)

(73) Assignee: RRC NETWORKS OY, Oulu (FI)

( * ) Notice: Subject to any disclaimer, the term of this patent is extended or adjusted under 35 U.S.C. 154(b) by 130 days.

(21) Appl. No.: 15/345,866

(22) Filed: Nov. 8, 2016

(65) Prior Publication Data

US 2017/0134224 A1    May 11, 2017

Related U.S. Application Data

(60) Provisional application No. 62/252,542, filed on Nov. 8, 2015.

(51) Int. Cl.
*G06F 15/177* (2006.01)
*H04L 12/24* (2006.01)

(52) U.S. Cl.
CPC .......... *H04L 41/22* (2013.01); *H04L 41/0883* (2013.01); *H04L 41/18* (2013.01)

(58) Field of Classification Search
CPC ...... H04L 41/22; H04L 41/0883; H04L 41/18
(Continued)

(56) References Cited

U.S. PATENT DOCUMENTS

| | | | |
|---|---|---|---|
| 8,880,690 B1 * | 11/2014 | Kennedy | H04L 41/0813 709/224 |
| 2002/0052937 A1 * | 5/2002 | Jager | H04L 29/06 709/220 |

(Continued)

*Primary Examiner* — Wing F Chan
*Assistant Examiner* — Joseph R Maniwang
(74) *Attorney, Agent, or Firm* — Ziegler IP Law Group, LLC

(57) ABSTRACT

There is provided a method of configuring a given communication network. Network-access information associated with at least one network configuration of the given communication network is stored. The network-access information comprises information about network connections between devices of the given communication network that are allowed when the at least one network configuration is being implemented in the given communication network. The at least one network configuration comprises a current network configuration of the given communication network. A user interface is provided to enable a user to make a change in the current network configuration of the given communication network. The user input defining a target functionality to be achieved for at least one device of the given communication network is received in a generic, device-independent form, via the user interface. The user input is translated from the generic, device-independent form into a device-specific form to determine at least one change to be made in the current network configuration. The at least one change to be made in the current network configuration is analyzed, while taking into account the network-access information associated with the current network configuration, to determine an impact of the at least one change on the network connections between the devices of the given communication network. The user is provided with information indicative of the impact of the at least one change on the network connections between the devices of the given communication network, via the user interface. The at least one change is verified with the user, via the user interface, thereby enabling the user to accept or reject the at least one change to be made in the current network configuration.

16 Claims, 21 Drawing Sheets

(58) Field of Classification Search
USPC .......................................................... 709/220
See application file for complete search history.

(56) References Cited

U.S. PATENT DOCUMENTS

| 2007/0067351 | A1* | 3/2007 | Singh | G06F 17/30286 |
|---|---|---|---|---|
| 2011/0099603 | A1* | 4/2011 | K | G06F 21/604 |
| | | | | 726/1 |
| 2014/0304780 | A1* | 10/2014 | Kuang | H04L 63/06 |
| | | | | 726/4 |
| 2014/0351106 | A1* | 11/2014 | Furr | G06Q 20/145 |
| | | | | 705/34 |

* cited by examiner

METHODS AND SYSTEMS FOR CONFIGURING COMMUNICATION NETWORKS

TECHNICAL FIELD

The present disclosure relates to methods of configuring a given communication network. Moreover, the present disclosure relates to systems for configuring a given communication network.

BACKGROUND

A complex computer network often comprises several interconnected systems that may be geographically divided and may have diverse requirements of a suitable networking environment. Specifically, topology of such a network may be defined by physical links between the interconnected systems and configuration of networking equipment such as routers, switches, and so forth. Therefore, connectivity within the network is usually established by forwarding packets between the interconnected systems using the networking equipment. Typically, to avoid loss of connectivity within the network, such networking equipment may be configured to reflect a specific configuration thereof. Further, changes to such specific configuration are required to be implemented in a systematic sequence.

Generally, while configuring complex computer networks, a user, for example a network administrator, may encounter various problems such as inability to use multiple internet connections, difficulty in configuring network before deployment, and so forth. Furthermore, the network administrator has to manually manage the network by planning the network configuration to reflect external requirements thereof, by selecting communication technologies (such as Ethernet, WIFI, VPN), by selecting appropriate hardware components to implement the selected communication technologies, by implementing the configuration into device specific units in a systematic sequence by using the devices' vendor specific configuration paradigms, by documenting the configuration, and by updating the documentation to avoid misconfiguration in the network. Due to the nature of complexity of the network and manual intervention, the configuration of such complex network is often prone to errors. Furthermore, device specific configurations have to be simplified to keep the complex computer network manageable. In such instance, capabilities of the networking equipment and the interconnected systems may not be fully utilized.

Therefore, in light of the foregoing discussion, there exists a need to overcome the aforementioned drawbacks associated with conventional techniques of network configuration and management.

SUMMARY

The present disclosure seeks to provide an improved method of configuring a given communication network.

The present disclosure also seeks to provide an improved system for configuring a given communication network.

A further aim of the present disclosure is to at least partially overcome at least some of the problems of the prior art, as discussed above.

In a first aspect, embodiments of the present disclosure provide a method of configuring a given communication network, the method comprising:

(a) storing network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;

(b) providing a user interface to enable a user to make a change in the current network configuration of the given communication network;

(c) receiving, via the user interface, a user input defining a target functionality to be achieved for at least one device of the given communication network in a generic, device-independent form;

(d) translating the user input from the generic, device-independent form into a device-specific form to determine at least one change to be made in the current network configuration;

(e) analyzing the at least one change to be made in the current network configuration, whilst taking into account the network-access information associated with the current network configuration, to determine an impact of the at least one change on the network connections between the devices of the given communication network;

(f) providing the user with information indicative of the impact of the at least one change on the network connections between the devices of the given communication network, via the user interface; and (g) verifying the at least one change with the user, via the user interface, thereby enabling the user to accept or reject the at least one change to be made in the current network configuration.

In a second aspect, embodiments of the present disclosure provide a system for configuring a given communication network, the system comprising:

a server arrangement; and a database arrangement coupled in communication with the server arrangement, wherein the server arrangement is operable to:

(a) store, at the database arrangement, network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;

(b) provide a user interface to enable a user to make a change in the current network configuration of the given communication network;

(c) receive, via the user interface, a user input defining a target functionality to be achieved for at least one device of the given communication network in a generic, device-independent form;

(d) translate the user input from the generic, device-independent form into a device-specific form to determine at least one change to be made in the current network configuration;

(e) analyze the at least one change to be made in the current network configuration, whilst taking into account the network-access information associated with the current network configuration, to determine an impact of the at least one change on the network connections between the devices of the given communication network;

(f) provide the user with information indicative of the impact of the at least one change on the network connections between the devices of the given communication network, via the user interface; and (g) verify the at least one change with the user, via the user interface, thereby enabling the user to accept or reject the at least one change to be made in the current network configuration.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
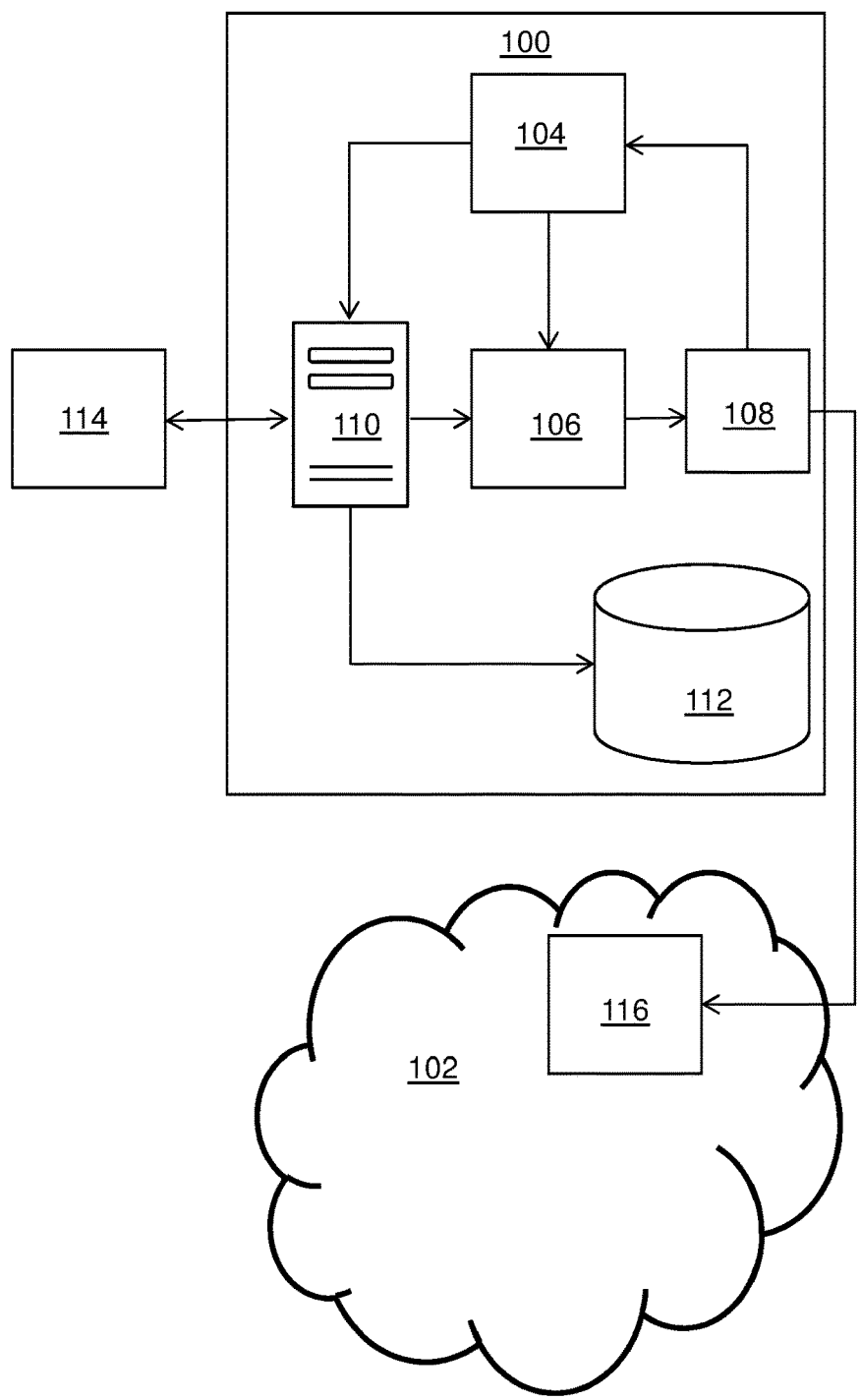
FIG. 1 is a schematic illustration of an example network environment, wherein a system for configuring a given communication network is implemented pursuant to embodiments of the present disclosure.

In the accompanying drawings, an underlined number is employed to represent an item over which the underlined number is positioned or an item to which the underlined number is adjacent.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

The term "target functionality" generally refers to a minimal specification, defining requirements of a given communication network, that a user provides via a user interface of a method and system pursuant to embodiments of the present disclosure. In other words, the target functionality defines what the given communication network should achieve, without going into unnecessary details of routing implementations, firewall rules, and the like. As an example, the target functionality may comprise information about two devices in the given communication network, while omitting all other information about the given communication network. As another example, the target functionality may comprise a requirement for the two devices to be able to connect to each other. Optionally, the target functionality is defined by using templates, for example, such as a network configuration template. Optionally, the target functionality does not comprise actual Internet Protocol (IP) addresses of devices; any required IP addresses are to be assigned automatically by the system pursuant to embodiments of the present disclosure, unless defined otherwise.

The term "high-level configuration" generally refers to an abstract device-platform-independent configuration that is used to define target functionalities of a given communication network. Optionally, the high level configuration is used in templates and documentation.

The term "mid-level configuration" generally refers to a device-platform-independent configuration that is obtained by processing the high-level configuration. It is used to provide network-specific details in a network configuration. Optionally, the mid-level configuration is used to define IP addresses and other information specific to a given device of a given communication network. The mid-level configuration is provided in a form that can be read and be understood by a networking professional.

The term "low-level configuration" generally refers to a device-platform-dependent configuration that is generated by translating the mid-level configuration and/or the high-level configuration. It defines a desired device-dependent functionality, and is generated by the method and system pursuant to embodiments of the present disclosure.

The terms "user interface" and "user entity" generally refer to a functional entity (for example, such as an executed software program) operating on behalf of and interacting with a local (namely, co-located) user to allow the user to configure a given communication network via the user interface provided by the method and system pursuant to embodiments of the present disclosure. An example of a user entity is a web browser running on a user device and executing program instructions for performing a network configuration. Another example of a user entity is a dedicated application or "App" running on a user device and executing program instructions for performing a network configuration.

The term "middleware" generally refers to a software or hardware component that translates the mid-level configuration into the low-level configuration.

The term "monitoring service" generally refers to an optional software or hardware component that monitors the state of network devices. Optionally, the monitoring service caches collected information for other components of the system pursuant to embodiments of the present disclosure. The information collected by the monitoring service is used to present the network device status and other details to the user, via the user interface. The monitoring service provides feedback to a coordinator.

The term "service locator" generally refers to an optional software or hardware component that retains the state and network addresses of the network devices and the components of the system pursuant to embodiments of the present disclosure. The coordinator and middleware components register their addresses to the service locator. The system components use the service locator to resolve addresses of other components on which they depend.

The term "coordinator" generally refers to an optional software or hardware component that accepts configuration files and commands from the user interface, and sends the said commands and configurations to a middleware that is configured to handle them. The coordinator takes into account technical requirements of the network, and processes the configurations in an order required by the network. Coordinators are optionally implemented on a per-client basis.

The term "NetFlow" generally refers to network traffic history, namely information used for identifying the type of network traffic. As an example, netflow data may comprise IP source, destination, protocol number, source and destination ports, along with timestamps and/or other identifiers.

The term "host device" generally refers to a device that can be connected to a communication network.

The term "site" generally refers to a physical location that has a network or networking hardware (for example, such as switches, routers, etc.) installed. As an example, the term "site" can be used to describe a physical customer location (for example, an office network).

The term "communication network" generally refers to a data communication network and/or its network environment that comprises multiple network devices that are connected together and offer connectivity to host devices.

The term "Internet" generally refers to a globally interconnected networking environment comprising multiple autonomous systems relaying traffic between each other over multiple third party networks and networking equipment.

The term "network equipment" generally refers to a network device used for handling network traffic.

The term "router" generally refers to a network device that routes network traffic based on IP packet information, either IPv4 or IPv6 addressing scheme. A router is capable of making routing decisions and transporting inter-network traffic based on routing rules (routing table).

The term "switch" generally refers to a network device that connects multiple host devices to form a network segment. It can also handle multiple, separated network segments independently.

The term "Ipv4" refers to the Internet Protocol (IP) version 4, wherein 32 bit addressing scheme is used to label IP packets to mark their source and destination.

The term "Ipv6" refers to the Internet Protocol (IP) version 6, wherein 128 bit addressing scheme is used to label IP packets to mark their source and destination.

The term "firewall" generally refers to a stand-alone network device or a feature in multi-purpose networking equipment or operating system that applies different kinds of access control rules, based upon IP addresses or other distinct information on an Ethernet frame to traffic passing through a network environment. Firewalls are commonly used to restrict usage of services open on host devices and servers. Firewall can additionally use Network Address Translation (NAT).

The term "NAT" generally refers to network address translation, which is a method for changing destination and/or source addresses of a network packet passing through a firewall or a router device. In IPv4 networking, NAT is a basic element of many home, office and corporate network as there is limited number of addresses available for organisations to use on public Internet.

The term "Conntrack" generally refers to connection tracking, which is a method for keeping track of the state of connections passing through a network device. In common usage scenarios, Conntrack is a necessary technology to provide NAT.

The term "server" generally refers to an application, program, process or device in a client/server relationship that responds to requests for information or services by another application, program, process or device (namely, a client) on a communication network. The term "server" also encompasses software that makes the act of serving information or providing services possible.

The term "client" generally refers to an application, program, process or device in a client/server relationship that requests information or services from another application, program, process or device (namely, a server) on a communication network. Importantly, the terms "client" and "server" are relative since an application may be a client to one application but a server to another application. The term "client" also encompasses software that makes the connection between a requesting application, program, process or device and a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

Embodiments of the Present Disclosure

In a first aspect, embodiments of the present disclosure provide a method of configuring a given communication network, the method comprising:
(a) storing network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;
(b) providing a user interface to enable a user to make a change in the current network configuration of the given communication network;
(c) receiving, via the user interface, a user input defining a target functionality to be achieved for at least one device of the given communication network in a generic, device-independent form;
(d) translating the user input from the generic, device-independent form into a device-specific form to determine at least one change to be made in the current network configuration;
(e) analyzing the at least one change to be made in the current network configuration, whilst taking into account the network-access information associated with the current network configuration, to determine an impact of the at least one change on the network connections between the devices of the given communication network;
(f) providing the user with information indicative of the impact of the at least one change on the network connections between the devices of the given communication network, via the user interface; and
(g) verifying the at least one change with the user, via the user interface, thereby enabling the user to accept or reject the at least one change to be made in the current network configuration.

It is to be noted here that the term "network-access information" generally refers to information about which device is allowed to access which device within the given communication network. Examples of such devices include, but are not limited to, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, servers, and large-sized touch screens with embedded PCs.

The given communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, community networks, satellite networks, vehicular networks, sensor networks, and Worldwide Interoperability for Microwave Access (WiMAX) networks. Such networks may run the Internet Protocol (IP), an information-centric protocol, or other protocols to achieve a desired data communication.

In some implementations, the given communication network is a customer network, while in other implementations, the given communication network is provided by a third party service provider.

Optionally, the method is implemented by way of a server arrangement comprising at least one server that is configured to perform (a) to (g).

Optionally, at (d), the user input is automatically translated from the generic, device-independent form into the device-specific form. Optionally, the method comprises employing a multi-level network modelling scheme, wherein the target functionality is defined by the user in a form of a high-level configuration, which is then processed into a form of a mid-level configuration, which is further processed into a form of a low-level configuration.

Optionally, using the high-level configuration for defining the target functionality enables the user to perform at least one of:
(i) define new networking zones and/or templates;
(ii) edit existing networking zones and/or templates;

(iii) describe the given communication network and its networking environment in general, commonly-understood terms.

Optionally, at least one of: the high-level configuration, the mid-level configuration, the low-level configuration is stored in an encrypted form.

It will be appreciated that the method is operable to automate the process of creating, changing and managing configurations of the devices of the given communication network. This potentially solves the problem of device manufacturer dependency that is faced by conventional configuration techniques.

Beneficially, in the method, the user is not required to access the device configurations directly. In other words, the user is only required to provide the user input defining the target functionality that he/she wants to achieve, and is not required to perform repetitive tasks or complex configurations that require multiple configuration options on multiple devices to be placed correctly.

Moreover, according to an embodiment of the present disclosure, the providing at (f) comprises simulating the impact of the at least one change individually on each of the network connections between the devices of the given communication network.

According to an embodiment of the present disclosure, the network-access information further comprises information about network connections between the devices of the given communication network and other devices outside the given communication network. Optionally, in such a case, the providing at (f) further comprises simulating the impact of the at least one change on the network connections between the devices of the given communication network and the other devices outside the given communication network.

Beneficially, such simulation enables the user to check the impact of the at least one change before verifying and making the at least one change in the current network configuration. Optionally, in this regard, the simulation comprises at least one of:
(i) a firewall simulation based upon historical network traffic flow data;
(ii) a network traffic simulation;
(iii) a simulation depicting a list of devices that are reachable by or are able to reach a given device of the given communication network.

It will be appreciated that the aforementioned method potentially prevents user errors. Before deployment of the at least one change, a software logic checks and warns the user about major changes occurring in the network connections, for example, via the simulation.

For illustration purposes only, there will now be considered an example scenario, wherein the user tries to make a change in the current network configuration. In the current network configuration, a first device is able to make a network connection to a second device, and a router therebetween accepts the network connection. In the illustrated example, there will now be considered that the first device is a laptop with IP address 192.168.0.4, and the second device is a server with IP address 10.100.10.2. The first device is in a first IP network of 192.168.0.0/24, while the second device is in a second IP network of 10.100.10.0/24.

In this regard, the router saves information of the network connection to a database arrangement, as follows:
From: 192.168.0.4
To: 10.100.10.2
Protocol: TCP
Source Port: 1024
Destination Port: 22

Now, the user defines the target functionality as follows:
1. prevent all IP connections to 10.100.10.2
2. allow all other connections from the first IP network to the second IP network Accordingly, the impact of the change defined by the target functionality is determined, and notified to the user as follows:
1. Simulate IP connection from 192.168.0.4 to 10.100.10.2 using source port 1024 and destination port 22. Result: IP connection denied, but it was accepted in history.
2. Simulate IP connection from the first IP network to the second IP network using a commonly-used protocol (for example, such as Transmission Control Protocol (TCP) with destination port 22). Result: IP connection was accepted, but it would have been rejected before configuration change.

The user then verifies the change, wherein the user either accepts or rejects the new network configuration.

Moreover, according to an embodiment of the present disclosure, the user interface comprises a graphical and symbolic user interface, and the providing at (f) comprises displaying to the user at least one visualization of the impact of the at least one change on the network connections, via the graphical and symbolic user interface. Optionally, in this regard, visualizations and function-oriented views related to management of the given communication network and its network environment are displayed to the user via the graphical and symbolic user interface.

Moreover, optionally, the user is provided with customer-network-specific documentation and help materials, for example, via manuals and video/multimedia presentations. This potentially enables the user to make changes to the network configuration with minimal probability of errors. As an example, video-based help materials may be rendered on-demand, for example, when the user requests help for a planned network change that requires physical changes in network cabling or topology.

Optionally, such manuals and presentations are updated dynamically. Additionally, such manuals and presentations are made available for downloading via the user interface. Moreover, optionally, such manuals and presentations are made available for portable user devices.

Furthermore, according to an embodiment of the present disclosure, the at least one change comprises a plurality of changes to be made in the current network configuration. Optionally, in such a case, the method further comprises determining an order in which the plurality of changes are to be deployed, so as to avoid an occurrence of a non-functional state of the given communication network; and deploying the plurality of changes in the determined order. This potentially solves deployment problems that are faced by conventional configuration techniques.

Optionally, in this regard, the deployment of various network configuration changes on multiple interconnected devices is performed in a coordinated manner. This potentially prevents unnecessary service break-ups from occurring.

Moreover, the method enables the user to configure the given communication network even before actual hardware deployment. Optionally, in this regard, the method enables the user to design, model and configure the given communication network and its network environment before taking an actual decision of buying desired services and/or ordering required equipment. Additionally, optionally, the method enables the user to continue configuring the given communication network and its network environment during the shipment of the ordered equipment.

Moreover, according to an embodiment of the present disclosure, the method further comprises maintaining an audit trail of changes made by the user; and allowing the user to roll back to an earlier network configuration of the given communication network.

Furthermore, optionally, the method further comprises enabling the user to perform at least one of:
(i) plan, model and document physical connection points (for example, such as cross cabling racks, cabinets or rooms) and connections between networked devices, according to physical installation space available for networking equipment (for example, such as Power Distribution Units (PDUs), cable guides, rack shelves or other rack-mounted accessories);
(ii) plan, model and document interconnects and cabling of the networking equipment relative to each other;
(iii) create written documentation with descriptive images according to user-made models.

Optionally, the method comprises configuring firewalls of the given communication network to temporarily allow network traffic to flow freely, prior to and during the deployment of the at least one change.

In this manner, the method pursuant to embodiments of the present disclosure enables the user to organize and manage the network connections between the devices easily. The method also enables the user to add multiple network connections to be used for redundant inter-network reachability simultaneously. Optionally, in this regard, the method enables the user to add multiple Internet connections for a single firewall at one go.

Moreover, according to an embodiment of the present disclosure, the network-access information is stored at (a) along with associated timestamps. Optionally, in this regard, the network-access information comprises information about IP traffic history. Optionally, in the method, a flow monitoring setup is employed to collect and analyze statistics pertaining to network traffic flow. As an example, the flow monitoring setup can be employed using a NetFlow protocol developed by Cisco®.

Furthermore, according to an embodiment of the present disclosure, the user input is received in an encrypted form. Optionally, in this regard, the user input is cryptographically signed by a user entity associated with the user, so as to enable verification of the authenticity of the user.

According to an embodiment of the present disclosure, the method further comprises authenticating and authorizing the user prior to performing (b) to (g). As a result, there is no need to have a central ultimately trusted point of authority or to reserve static Internet Protocol (IP) addresses for network administrators.

Optionally, in this regard, the method comprises allowing a network administrator to create access passwords to be used by host devices for accessing different network zones during the process of deployment.

Moreover, the method pursuant to embodiments of the present disclosure is capable of solving chain of trust problems between communicating parties. As an example, the aforementioned method can be used to manage Virtual Private Network (VPN) connections between organizations based upon trust relationships. As another example, the method can be used to manage service-related firewall rules to allow usage of a desired service. Moreover, the method is capable of providing a scalable and secure service platform based upon third party vendor customer trust relationships.

Optionally, in this regard, the method comprises making and verifying cryptographic signatures of the communicating parties at the edge. As an example, cryptographic signatures of the user and a third party service provider can be verified at the user interface and a middleware, respectively.

For illustration purposes only, there will now be considered a simplified example of a target functionality defined by a user and how it is translated from a generic, device-independent form to a device-specific form. One such example has been illustrated in conjunction with FIG. 7 as explained in more detail below.

In the illustrated example, there will now be considered a network environment having two sites, namely 'Site 1' and 'Site 2'. Both sites have their own office networks, which are based on the "Office Network Template". Site 1 has a services network, wherein an Active Directory (AD, Active Directory (AD) is a directory service that Microsoft® developed for Windows® domain networks) Server has a static networking configuration that is known by the user. Access to the AD Server is provided from the office networks.

There is no direct Internet access at Site 2. Therefore, the user defines the target functionality as follows:
the office network of Site 2 is to be configured to access the Internet through a network device (for example, a router) of Site 1 using VPN connection with Advanced Encryption Standard (AES)-128 encryption.

Accordingly, a general model for the network environment is derived using some default values and non-overlapping LAN network addressing.

In this regard, following definitions of networking zones within the network environment are configured to apply:

"WAN" generally refers to a special purpose "zone" for defining that this network should be treated as an external, routed layer 3 (L3) type of network. This implies that following can be applicable:

(i) source Network Address Translation (NAT); and (ii) multiple instances are possible; for example, old company L3 VPN network, which is visible in through a single point of presence.

Moreover, the WAN defaults to the Internet with relevant firewalling, etc.

"Site" generally refers to an end user networking site or physical location on which it is possible to connect devices directly over physical media. It has configuration parameters to define site global variables and overrides.

"Router" generally refers to a router located on a specific networking site. It is a base unit for configuration management, and is capable of handling inter-network connectivity, firewalling, etc.

"Network Template" generally refers to a general-purpose oriented set of parameters describing the usage of a specific network element to be deployed on a site or multiple sites.

"Network instance" generally refers to a site-specific instance of the Network Template defining either automatically or by user interaction the IP addresses and/or other specifics of the instance. It inherits parameters from the template. It overrides parameters by site global configuration or network-specific configuration.

Some other examples of generic definitions applicable to the illustrated example are as follows:

"Global Configuration" is performed using the following:

(i) at least AES-128 encryption for site-to-site connections;

(ii) at least AES-128 encryption for client connections;

(iii) the Internet WAN configuration on sites.

"Network template configuration" is performed using the following:
(i) Office network (template), wherein:
  1. GateWay (GW) address is a first available address;
  2. Dynamic Host Configuration Protocol (DHCP) range is from 0.100 and address limitation is 100;
  3. the Internet access is allowed for hosts.
(ii) Services network (template), wherein:
  1. GW address is a first available address;
  2. there is no DHCP;
  3. there is no Internet access; and
  4. access is allowed from template Office network to Server AD address.

"Site configuration" is performed using the following:
For Site 1:
(i) Internet access is allowed through Site 1 router; and
(ii) Networks available are:
  1. Office Network,
  2. Services Network, which has one pre-configured AD server with static IP address 10.100.9.10/24, with gateway 10.100.9.1
For Site 2:
(i) No direct Internet access is allowed
(ii) Networks available are:
  1. Office Network.

In the illustrated example, the target functionality can be represented in JavaScript Object Notation (JSON) format, as follows:

```
{
"sites":
{
    "05bff946-5ec4-11e5-9fa0-14109fd625cf":
{
    "description": "Main site with Office and Services network. Accesses Internet through local WAN.",
    "name": "Site 1",
    "zones":
    {
      "office":
      {
        "template": "office_site"
      },
      "services":
      {
        "template": "services_network"
      }
    }
},
    "f35070dc-5ec4-11e5-99bd-14109fd625cf":
{
    "name": "Site 2",
    "zones":
    {
      "office":
      {
        "fw_rules": [
        {
          "description": "Disallow Internet access through local site",
          "direction": "out",
          "local_only": true,
          "type": "disallow",
          "zone_type": "wan"
        },
        {
          "description": "Allow Internet access through Site 1",
          "direction": "out",
          "site": "05bff946-5ec4-11e5-9fa0-14109fd625cf",
          "type": "allow",
          "zone_type": "wan"
        }
        ],
        "template": "office_site"
      }
    }
}
},
"zone_templates":
{
    "office_site":
    {
      "dhcp_limit": 100,
      "dhcp_start": "net+100",
      "fw_rules": [
      {
        "direction": "out",
        "local_only": true,
        "type": "allow",
        "zone_type": "wan"
      }
      ],
      "gw_address": "net+1",
      "routers":
      {
        "main_gw":
        {
          "description": "Main router for the office site",
          "type": "main_gateway",
          "vendor": "rrc"
        }
      },
      "template": "site"
    },
    "services_network":
    {
      "fw_rules": [
      {
        "description": "Allow office networks to access hosts of type AD",
        "direction": "in",
        "from_template": "office_site",
        "to_host_type": "ad",
        "type": "allow"
      }
      ],
      "gw_address": "net+1",
      "routers":
      {
        "main_gw":
        {
          "description": "Main router for the network site",
          "type": "main_gateway",
          "vendor": "rrc"
        }
      },
      "static_hosts": [
      {
        "icon": "windows_server",
        "type": "ad",
        "ip" : "10.100.9.10",
        "gateway" : "10.100.9.1"
      }
      ]
    },
    "site":
    {
      "dhcp_server": true,
      "icon": "site"
    },
    "wan":
    {
      "default_gw": true,
      "icon": "internet",
      "source_nat": true,
      "type": "wan"
    }
}
}
```

The target functionality is then translated from the high-level configuration to the mid-level configuration. In this phase, templates and actual configurations are flattened into a configuration without external dependencies. Missing network addresses (for example, IP addresses) are filled in whenever necessary. These IP addresses are stored for re-use during next generation of the network configuration.

An example mid-level configuration can be represented as follows:

Site 1
  LAN interface
    Template: office_site
    IPv4 address: 10.100.10.1 (autoassigned)
    Netmask 255.255.255.0 (autoassigned)
    DHCP server:
      range 10.100.10.100 to 10.100.10.200 (autoassigned)
      gateway 10.100.10.1
      AD server 10.100.9.1
  LAN2 interface
    Template: services network
    IPv4 address: 10.100.9.1 (autoassigned)
    Netmask 255.255.255.0 (autoassigned)
    DHCP server disabled
  WAN interface
    Mode: DHCP client
    Source NAT on
  Firewall
    Allow from 10.100.10.0/24 to 10.100.9.10 (Office to AD)
    Allow from 10.100.11.0/24 to 10.100.9.10 (Remote office to AD)
    Allow from 10.100.10.0/24 to WAN interface
    Allow from 10.100.11.0/24 to WAN interface
  VPN
    VPN to Site 2
      Mode: Layer 3 routed
      Encryption requirement: at least AES-128
Site 2
  LAN interface
    Template: office_network
    IPv4 address: 10.100.11.1 (autoassigned)
    Netmask 255.255.255.0 (autoassigned)
    DHCP server:
      range 10.100.10.100 to 10.100.10.200 (autoassigned)
      gateway 10.100.11.1
      AD server 10.100.9.1
  WAN interface
    Mode: DHCP client
    Source NAT on
  Firewall
    Allow from 10.100.11.0/24 to Site 1 (for Internet access, for AD access)
  VPN
    VPN to Site 1
      Mode: Layer 3 routed
      Encryption requirement: at least AES-128

The mid-level configuration can be represented in the JSON format, as follows:

Site 1 JSON data

```
{
"firewall": [
    {
        "from": "10.100.10.0/24",
        "to_net": "10.100.9.10",
        "type": "allow"
    },
    {
        "from": "10.100.11.0/24",
        "to_net": "10.100.9.10",
        "type": "allow"
    },
    {
        "from": "10.100.10.0/24",
        "to_iface": "wan",
        "type": "allow"
    },
    {
        "from": "10.100.11.0/24",
        "to_iface": "wan",
        "type": "allow"
    }
],
"interfaces":
{
    "lan":
    {
        "ad": "10.100.9.10",
        "dhcp_end": "10.100.10.200",
        "dhcp_gateway": "10.100.10.1",
        "dhcp_start": "10.100.10.100",
        "ip4_address": "10.100.10.1",
        "ip4_netmask": "255.255.255.0",
        "ip4_network": "10.100.10.0"
    },
    "lan2":
    {
        "ip4_address": "10.100.9.1",
        "ip4_netmask": "255.255.255.0",
        "ip4_network": "10.100.9.0"
    },
    "wan":
    {
        "dhcp4_client": true,
        "source_nat": true
    }
},
"name": "Site 1",
"timestamp": 1430562397,
"type": "site",
"uuid": "05bff946-5ec4-11e5-9fa0-14109fd625cf",
"vpn": [
    {
        "connected_sites": [
            {
                "encryption": "aes128",
                "mode": "layer3",
                "protocol": "ipv4",
                "uuid": "071e9ea8-5ed5-11e5-b458-14109fd625cf",
                "routes": [ "10.100.11.0/24" ]
            }
        ],
        "type": "routed"
    }
]
}
```

Site 2 JSON data

```
{
"firewall": [
    {
        "from": "10.100.11.0/24",
        "to_site": "05bff946-5ec4-11e5-9fa0-14109fd625cf",
        "type": "allow"
    }
],
"interfaces":
{
    "lan":
    {
        "ad": "10.100.9.10",
        "dhcp_end": "10.100.11.200",
        "dhcp_gateway": "10.100.11.1",
```

```
        "dhcp_start": "10.100.11.100",
        "ip4_address": "10.100.11.1",
        "ip4 netmask": "255.255.255.0",
        "ip4_network": "10.100.11.0"
      },
      "wan":
      {
        "dhcp4_client": true,
        "source_nat": true
      }
    },
    "name": "Site 2",
    "timestamp": 1430562397,
    "type": "site",
    "uuid": "071e9ea8-5ed5-11e5-b458-14109fd625cf",
    "vpn": [
      {
        "connected_sites": [
          {
            "encryption": "aes128",
            "mode": "layer3",
            "protocol": "ipv4",
            "uuid": "05bff946-5ec4-11e5-9fa0-14109fd625cf",
            "routes": [ "default" ]
          }
        ],
        "type": "routed"
      }
    ]
  }
```

Finally, the mid-level configuration is translated to the low-level configuration, which can be used on actual router/firewall devices. It will be appreciated that the target devices are not limited to a specific brand or manufacturer; could include any device that supports the required target functionality.

In a second aspect, embodiments of the present disclosure provide a system for configuring a given communication network, the system comprising:
a server arrangement; and
a database arrangement coupled in communication with the server arrangement,
wherein the server arrangement is operable to:
(a) store, at the database arrangement, network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;
(b) provide a user interface to enable a user to make a change in the current network configuration of the given communication network;
(c) receive, via the user interface, a user input defining a target functionality to be achieved for at least one device of the given communication network in a generic, device-independent form;
(d) translate the user input from the generic, device-independent form into a device-specific form to determine at least one change to be made in the current network configuration;
(e) analyze the at least one change to be made in the current network configuration, whilst taking into account the network-access information associated with the current network configuration, to determine an impact of the at least one change on the network connections between the devices of the given communication network;
(f) provide the user with information indicative of the impact of the at least one change on the network connections between the devices of the given communication network, via the user interface; and
(g) verify the at least one change with the user, via the user interface, thereby enabling the user to accept or reject the at least one change to be made in the current network configuration.

According to an embodiment of the present disclosure, when providing at (f), the server arrangement is operable to simulate the impact of the at least one change individually on each of the network connections between the devices of the given communication network.

According to an embodiment of the present disclosure, the network-access information further comprises information about network connections between the devices of the given communication network and other devices outside the given communication network. Optionally, when providing at (f), the server arrangement is operable to simulate the impact of the at least one change on the network connections between the devices of the given communication network and the other devices outside the given communication network.

According to an embodiment of the present disclosure, the user interface comprises a graphical and symbolic user interface, wherein, when providing at (f), the server arrangement is operable to display to the user at least one visualization of the impact of the at least one change on the network connections, via the graphical and symbolic user interface.

Moreover, according to an embodiment of the present disclosure, the at least one change comprises a plurality of changes to be made in the current network configuration, and wherein the server arrangement is operable to determine an order in which the plurality of changes are to be deployed, so as to avoid an occurrence of a non-functional state of the given communication network; and to deploy the plurality of changes in the determined order. In this regard, the system is operable to coordinate configuration of network equipment to achieve the target functionality defined by the user. The configuration is performed in an ordered manner to avoid loss of connectivity.

According to an embodiment of the present disclosure, the server arrangement is operable to store the network-access information along with associated timestamps at the database arrangement.

According to an embodiment of the present disclosure, the server arrangement is operable to receive the user input in an encrypted form.

According to an embodiment of the present disclosure, the server arrangement is operable to authenticate and authorize the user prior to performing (b) to (g).

Moreover, the server arrangement is operable to execute the aforementioned method pursuant to the first aspect.

The system pursuant to embodiments of the present disclosure enables the user to securely configure and manage the given communication network, based upon target functionalities to be achieved by the given communication network and its network environment. The system aims to save network administrators' time, prevent configuration errors, prevent network downtime and automate documentation of the network.

The system is operable to automate the tedious, repetitive and error prone tasks of network configuration. This allows the network administrators to focus on more high level tasks of defining the target functionalities. This also makes it possible for smaller companies to administrate fairly complex network setups to support their business requirements.

In some implementations, the server arrangement and the database arrangement are provided via centrally-managed cloud-based services.

It will be appreciated that in implementations of the system pursuant to embodiments of the present disclosure, networking hardware resides on customer sites and can be either leased or owned by the customers. Equipment management is typically performed by traditional network-equipment-specific management interfaces by a middleware that can be either hosted by a service provider or locally on a customer site. In either case, all the functional changes to the network environment are optionally authorized by the user. This potentially allows the middleware to verify the authenticity of the configuration change request cryptographically using asynchronous cryptography, for example, such as the RSA algorithm. This potentially enables the system to achieve strong data security regardless of the middleware hosting environment, because a breach into the hosting environment does not allow an attacker to perform any configuration change or any other operations on the communication network.

For illustration purposes only, there will now be considered an example implementation of the aforementioned system. One such implementation has been illustrated in conjunction with FIG. 1 as explained in more detail below.

The server arrangement comprises a plurality of servers. At least one of these servers is configured to provide a monitoring service (hereinafter referred to as the "monitoring server"). At least one of these servers is configured to be implemented as a coordinator. At least one of these servers is configured to be implemented as a middleware. Optionally, at least one of these servers is configured to provide a frontend that interacts with the user device to provide the user interface.

Detailed Description of the Drawings

Referring now to the drawings, particularly by their reference numbers, FIG. 1 is a schematic illustration of an example network environment, wherein a system 100 for configuring a given communication network 102 is implemented pursuant to embodiments of the present disclosure. The system 100 comprises a server arrangement that comprises a monitoring server 104, a coordinator 106, a middleware 108, and a frontend 110. The system 100 also comprises a database arrangement 112 that is coupled in communication with the server arrangement.

The frontend 110 interacts with a user device 114 to provide a user interface to a user. The frontend 110 receives a user input defining a target functionality to be achieved by the given communication network 102. It is translated by middleware 108 from a generic device-independent form into a device-specific form. The coordinator 106 then deploys required changes via the middleware 108.

With reference to FIG. 1, the middleware 108 configures a network device 116 of the given communication network 102. The middleware 108 is located in a service provider's network.

FIG. 1 is merely an example, which should not unduly limit the scope of the claims herein. It is to be understood that the specific designation for the network environment is provided as an example and is not to be construed as limiting the network environment to specific numbers, types, or arrangements of devices, server arrangements, database arrangements and communication networks. A person skilled in the art will recognize many variations, alternatives, and modifications of embodiments of the present disclosure.

Figure 2:
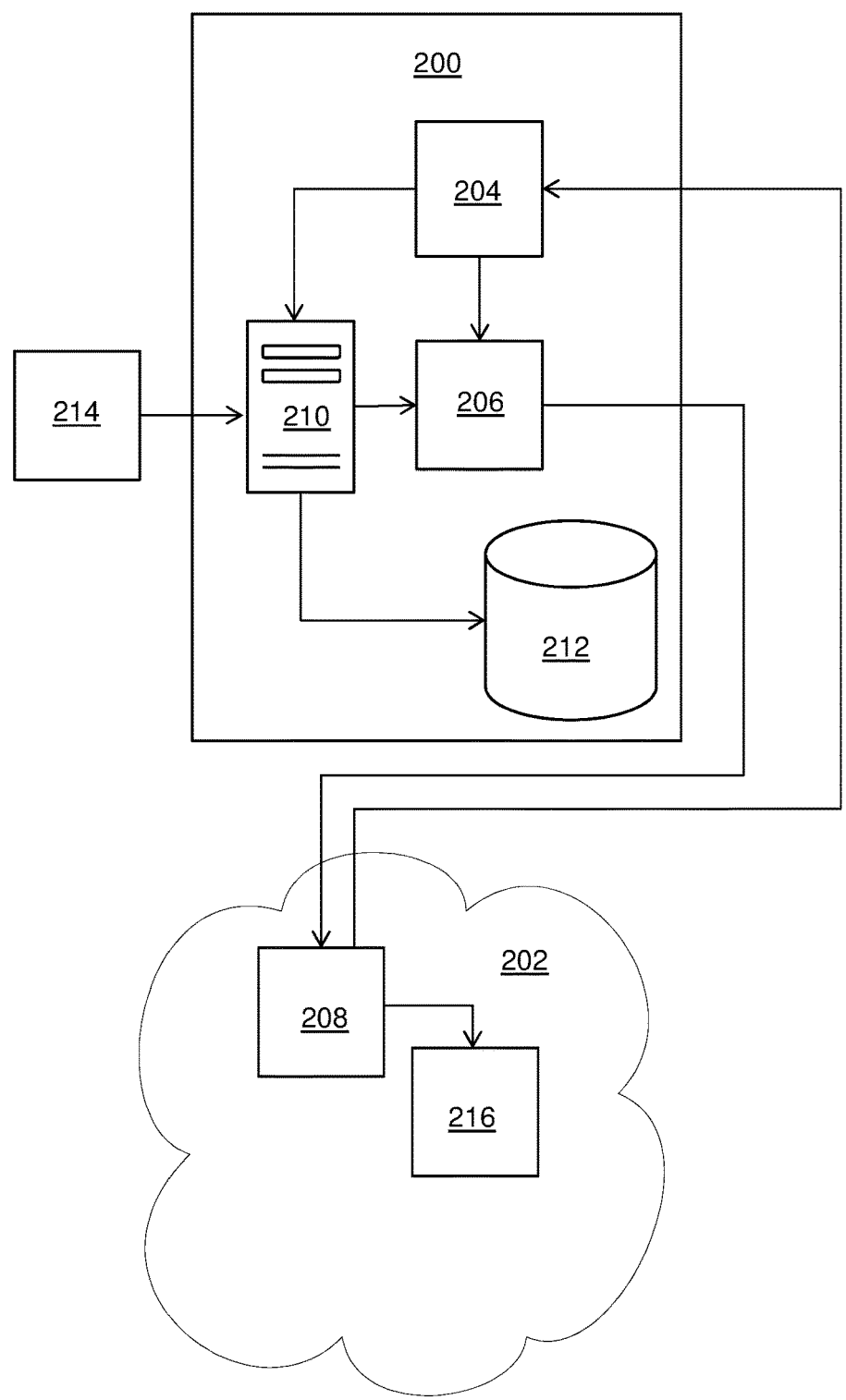
FIG. 2 is a schematic illustration of another network environment, wherein a system for configuring a given communication network is implemented pursuant to embodiments of the present disclosure.

FIG. 2 is a schematic illustration of another network environment, wherein a system 200 for configuring a given communication network 202 is implemented pursuant to embodiments of the present disclosure. The system 200 comprises a server arrangement that comprises a monitoring server 204, a coordinator 206, a middleware 208, and a frontend 210. The system 200 also comprises a database arrangement 212 that is coupled in communication with the server arrangement.

The frontend 210 interacts with a user device 214 to provide a user interface to a user. The frontend 210 receives a user input defining a target functionality to be achieved by the given communication network 202, and translates it from a generic device-independent form into a device-specific form. The coordinator 206 then deploys required changes via the middleware 208.

With reference to FIG. 2, the middleware 208 configures a network device 216 of the given communication network 202. The middleware 208 is located in the given communication network 202 (namely, a customer network).

FIG. 2 is merely an example, which should not unduly limit the scope of the claims herein. It is to be understood that the specific designation for the network environment is provided as an example and is not to be construed as limiting the network environment to specific numbers, types, or arrangements of devices, server arrangements, database arrangements and communication networks. A person skilled in the art will recognize many variations, alternatives, and modifications of embodiments of the present disclosure.

Figure 3:
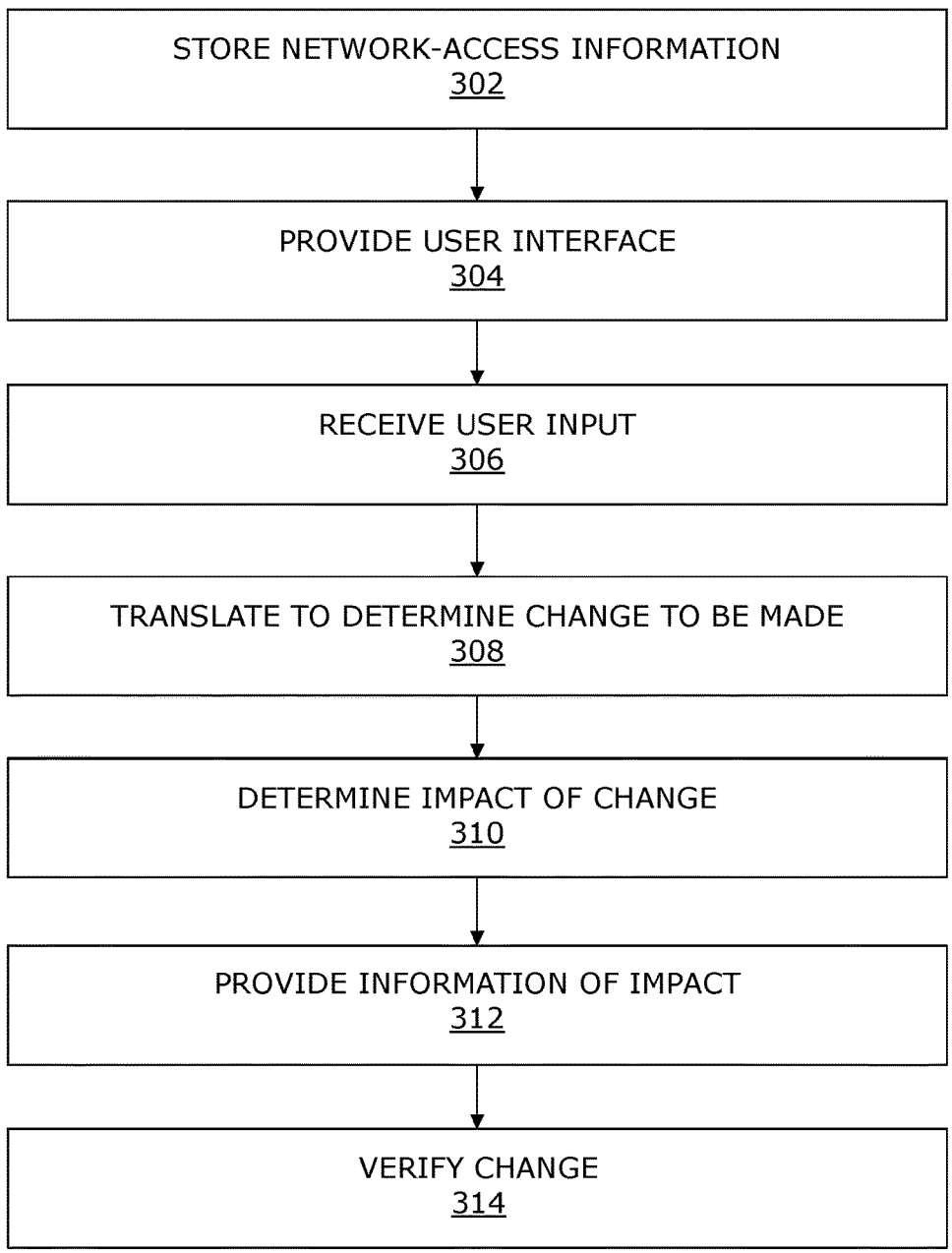
FIG. 3 is an illustration of steps of a method of configuring a given communication network, in accordance with an embodiment of the present disclosure.

FIG. 3 is an illustration of steps of a method of configuring a given communication network, in accordance with an embodiment of the present disclosure. The method is depicted as a collection of steps in a logical flow diagram, which represents a sequence of steps that can be implemented in hardware, software, firmware or a combination thereof.

At a step 302, network-access information associated with at least one network configuration of the given communication network is stored.

At a step 304, a user interface is provided to enable a user to make a change in the current network configuration of the given communication network.

At a step 306, a user input defining a target functionality to be achieved for at least one device of the given communication network in a generic, device-independent form is received via the user interface.

At a step 308, the user input is translated from the generic, device-independent form into a device-specific form to determine at least one change to be made in the current network configuration.

At a step 310, the at least one change to be made in the current network configuration is analyzed, whilst taking into account the network-access information associated with the current network configuration, to determine an impact of the at least one change on the network connections between the devices of the given communication network.

At a step 312, the user is provided with information indicative of the impact of the at least one change on the network connections between the devices of the given communication network, via the user interface.

At a step 314, the at least one change is verified with the user, via the user interface, thereby enabling the user to accept or reject the at least one change to be made in the current network configuration.

The steps 302 to 314 are only illustrative and other alternatives can also be provided where one or more steps are added, one or more steps are removed, or one or more steps are provided in a different sequence without departing from the scope of the claims herein.

Figure 4:
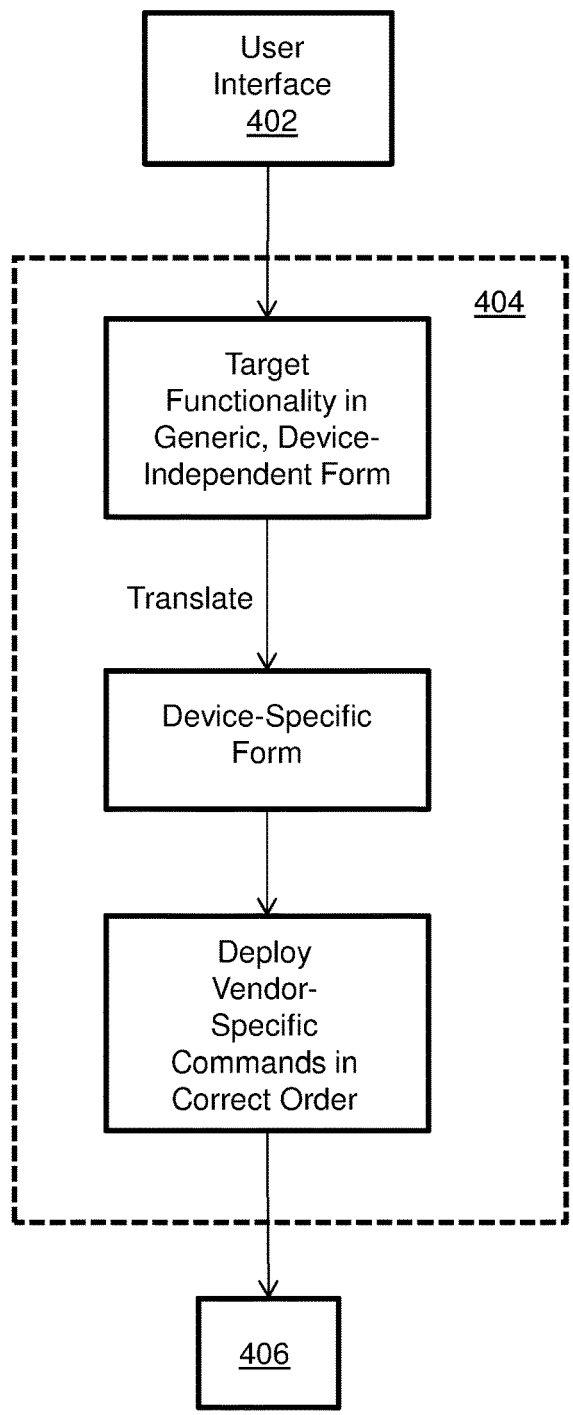
FIG. 4 is a schematic illustration of a user input specified in a generic, device-independent form being translated into a device-specific form, according to an embodiment of the present disclosure.

FIG. 4 is a schematic illustration of a user input specified in a generic, device-independent form being translated into a device-specific form, according to an embodiment of the present disclosure.

The user specifies a target functionality of a given communication network by using a user interface 402 provided by a system 404 pursuant to embodiments of the present disclosure.

The system 404 translates the target functionality to the device-specific form, and coordinates how the new network configuration is applied to devices 406 of the given communication network.

FIG. 4 is merely an example, which should not unduly limit the scope of the claims herein. A person skilled in the art will recognize many variations, alternatives, and modifications of embodiments of the present disclosure.

Figure 5:
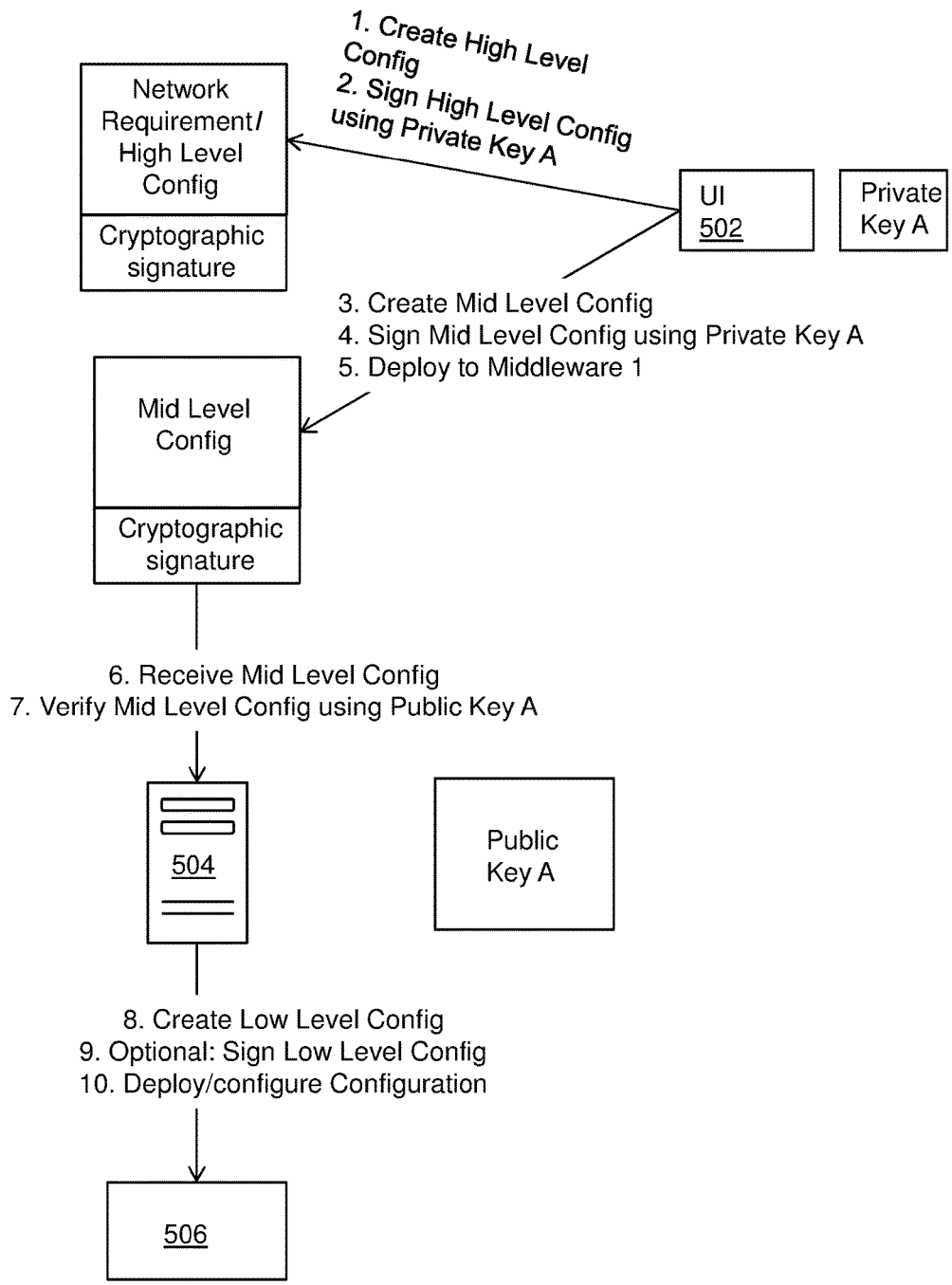
FIG. 5 is a schematic illustration of an example implementation of an automatic configuration translation mechanism, from a user-defined target functionality into a device-specific (namely, low-level) configuration, with a cryptographic authentication mechanism provided by a system pursuant to embodiments of the present disclosure.

FIG. 5 is a schematic illustration of an example implementation of an automatic configuration translation mechanism, from a user-defined target functionality into a device-specific (namely, low-level) configuration, with a cryptographic authentication mechanism provided by a system pursuant to embodiments of the present disclosure.

A user creates a high-level configuration using a user interface 502 provided by the system, and signs it using his/her private key 'A'.

Optionally, the user interface translates the high-level configuration into a mid-level configuration using historical network-access information, and signs it using the private key 'A'.

A middleware 504 of the system receives the mid-level configuration and verifies its authenticity using the user's public key 'A'. Upon successful authentication, the middleware 504 translates the mid-level configuration into a low-level configuration and optionally signs it. The middleware 504 then deploys the low-level configuration into devices 506 of the communication network.

FIG. 5 is merely an example, which should not unduly limit the scope of the claims herein. A person skilled in the art will recognize many variations, alternatives, and modifications of embodiments of the present disclosure.

Figure 6:
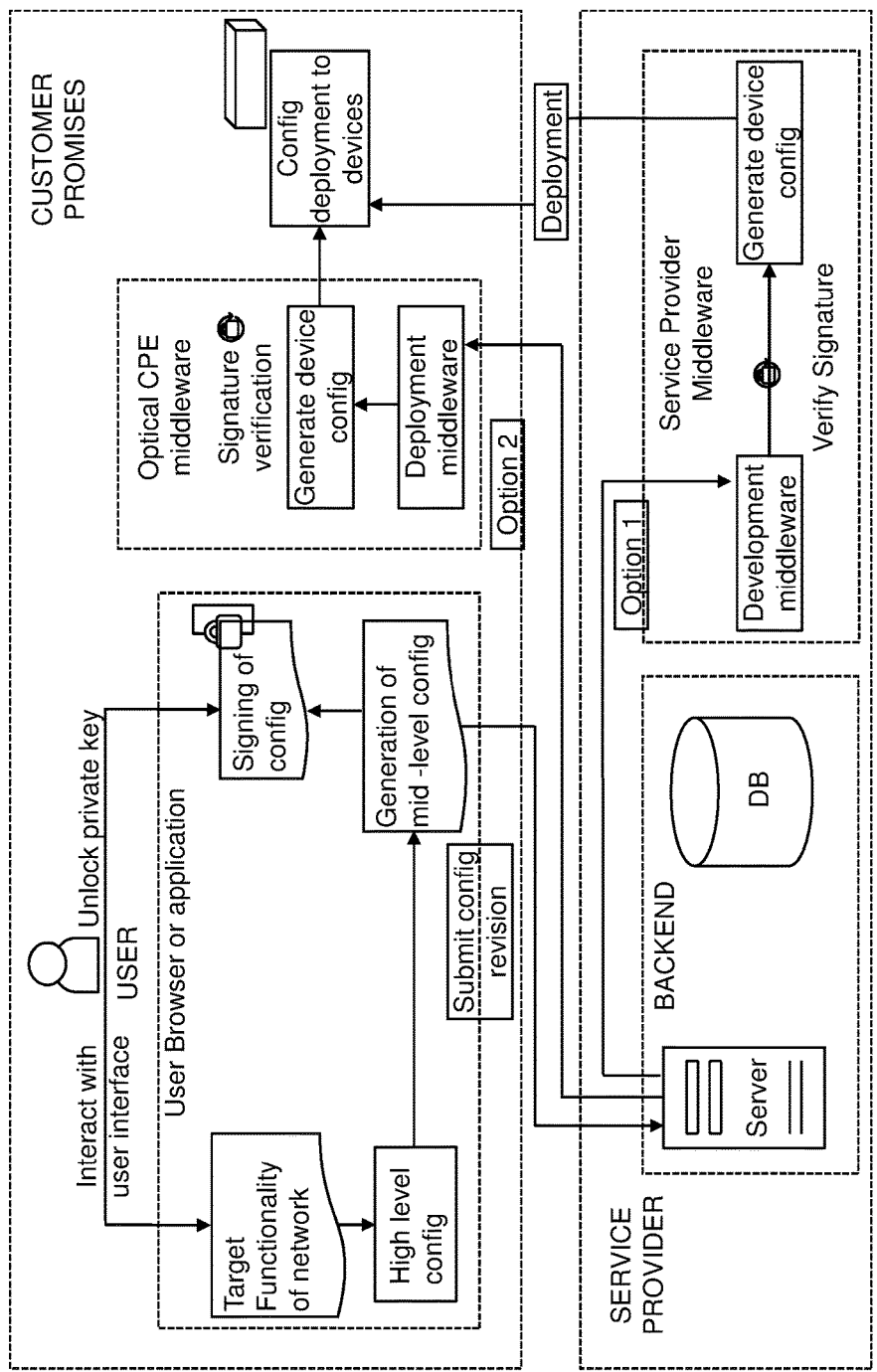
FIG. 6 is a schematic illustration of another example implementation of an automatic configuration translation mechanism, from the user-defined target functionality into a device-specific configuration, with a cryptographic authentication mechanism provided by a system pursuant to embodiments of the present disclosure.

FIG. 6 is a schematic illustration of another example implementation of an automatic configuration translation mechanism, from the user-defined target functionality into a device-specific configuration, with a cryptographic authentication mechanism provided by a system pursuant to embodiments of the present disclosure.

With reference to FIG. 6, two options are provided. In option 1, a service provider middleware is operable to perform the translation and authentication mechanisms. In option 2, a middleware at a customer site is operable to perform the translation and authentication mechanisms. It will be appreciated that the option 1 can be implemented with the network environment illustrated in conjunction with FIG. 1, while the option 2 can be implemented with the network environment illustrated in conjunction with FIG. 2.

FIG. 6 is merely an example, which should not unduly limit the scope of the claims herein. A person skilled in the art will recognize many variations, alternatives, and modifications of embodiments of the present disclosure.

Figure 7:
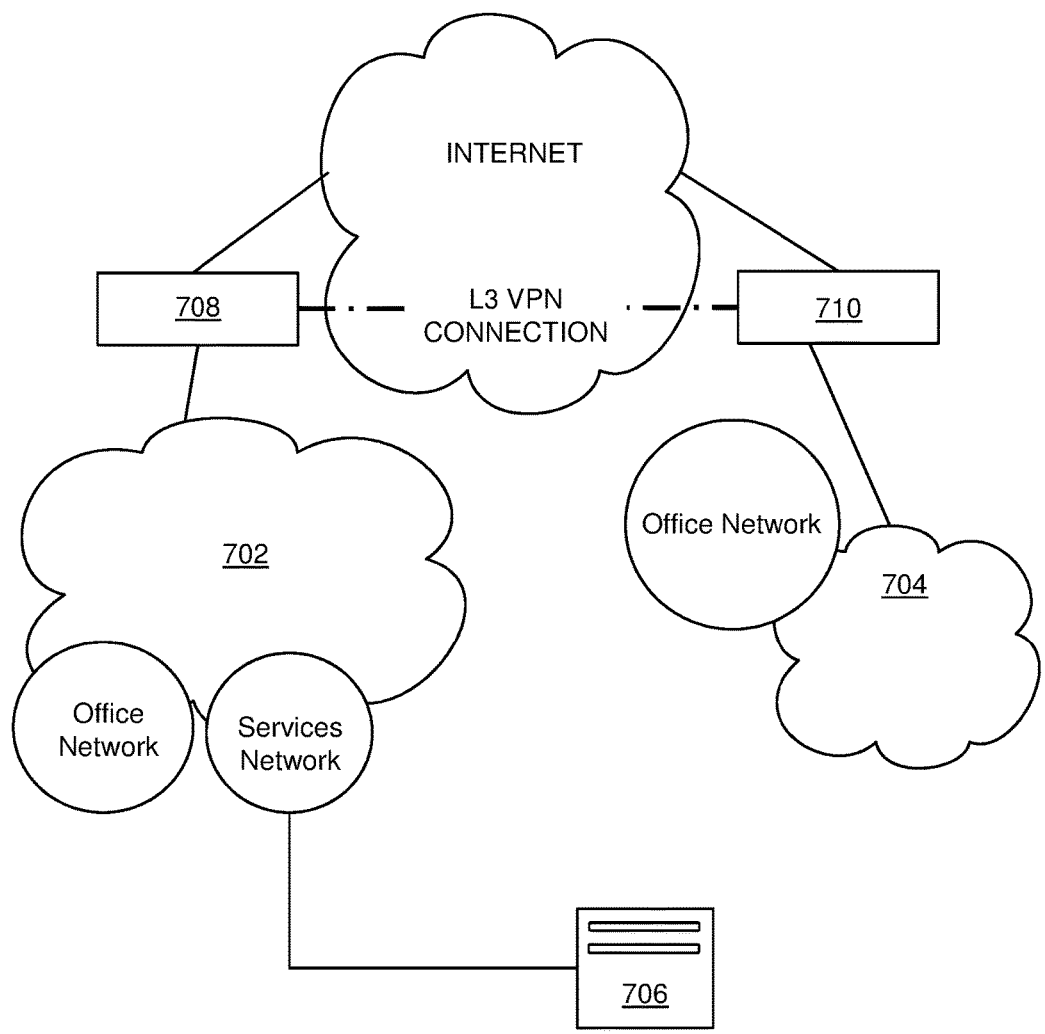
FIG. 7 is a schematic illustration of an example of a target functionality defined by the user, according to an embodiment of the present disclosure.

FIG. 7 is a schematic illustration of a target functionality that has been illustrated with the help of an example earlier.

In the illustrated example, there are two sites, depicted as sites 702 and 704. Both sites 702 and 704 have their own office networks, while only the site 702 has a services network, wherein an AD server 706 has a static networking configuration that is known by the user. There is no direct Internet access at the site 704.

In the target functionality, the user defines that the office network of the site 704 is to be configured to access the Internet through a VPN connection between a network device 708 of the site 702 and a network device 710 of the site 704.

FIG. 7 is merely an example, which should not unduly limit the scope of the claims herein. A person skilled in the art will recognize many variations, alternatives, and modifications of embodiments of the present disclosure.

Figure 8:
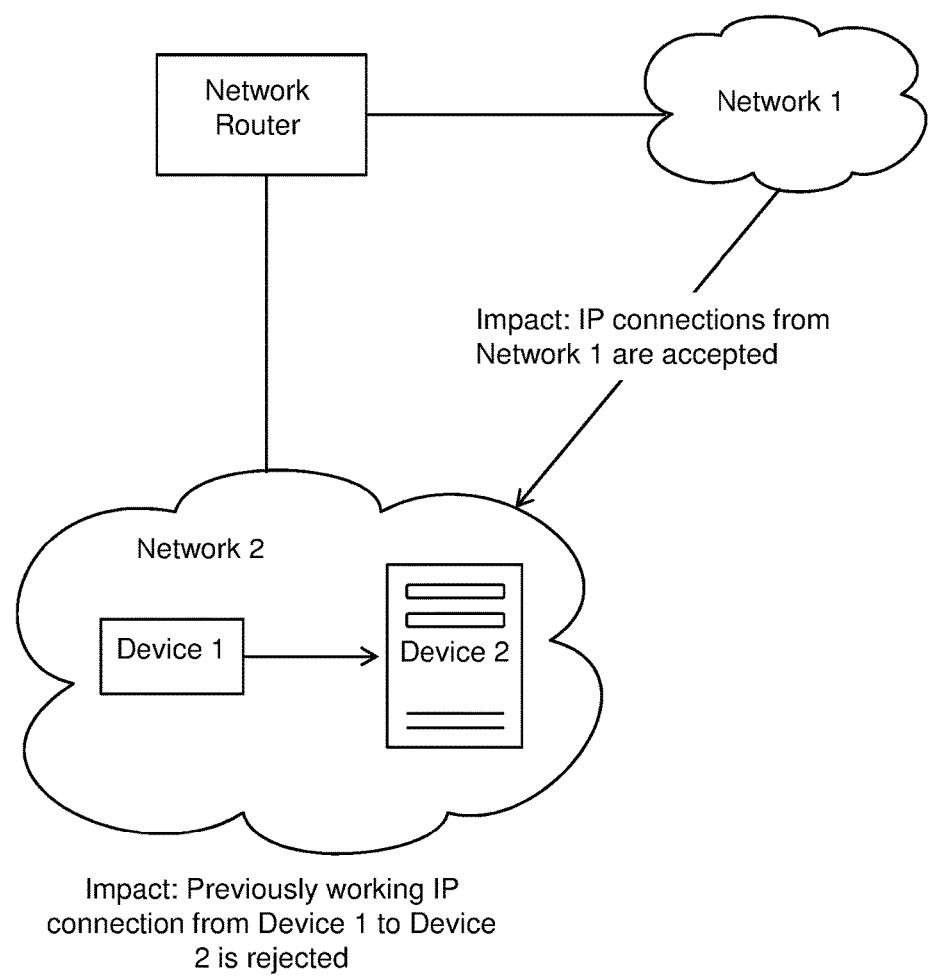
FIG. 8 is a schematic illustration of an error-prevention view of a user interface provided by the method and system pursuant to embodiments of the present disclosure.

FIG. 8 is a schematic illustration of an error-prevention view of a user interface provided by the method and system pursuant to embodiments of the present disclosure.

In the error-prevention view, there is shown an impact of a target functionality defined by a user on the current network configuration. This warns the user about major changes occurring in the network connections.

FIG. 8 is merely an example, which should not unduly limit the scope of the claims herein. A person skilled in the art will recognize many variations, alternatives, and modifications of embodiments of the present disclosure.

Figure 9A:
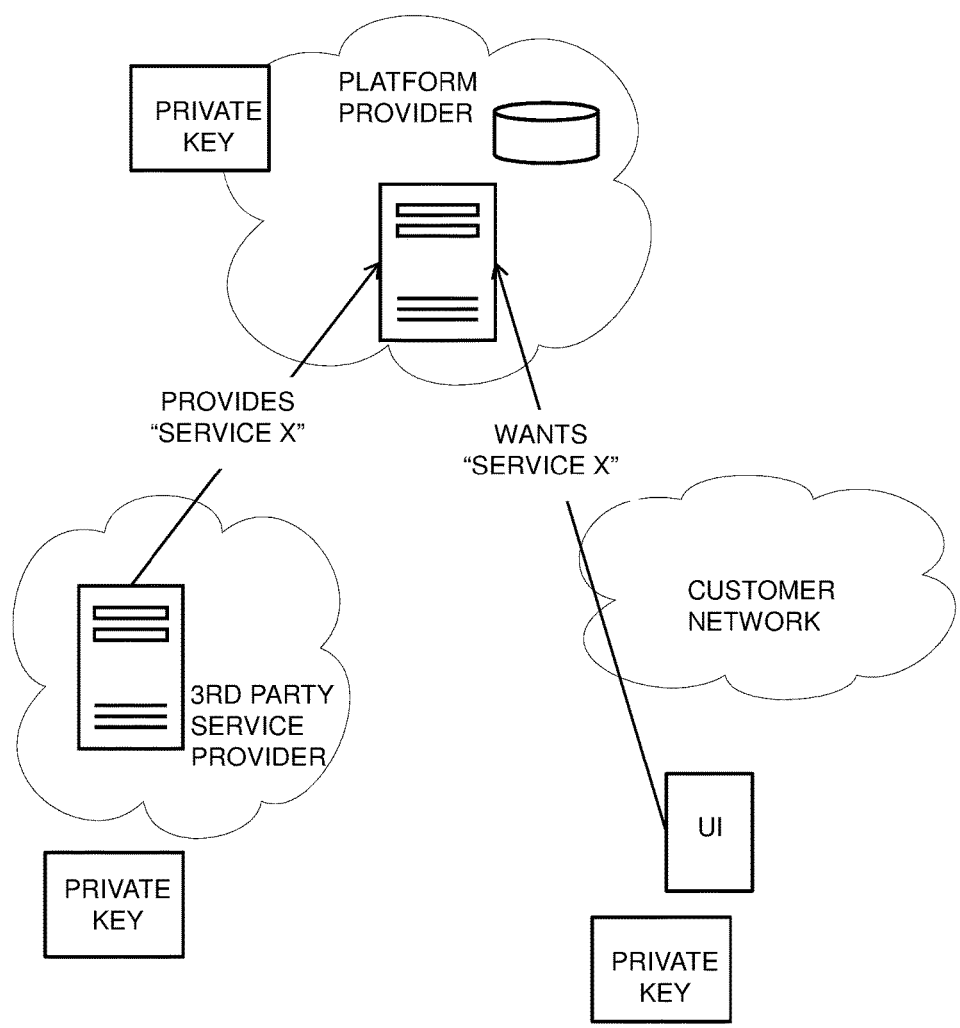
FIG. 9A is a schematic illustration of an example scenario wherein a third party service provider provides a service "X" that a user wants to use for his/her customer network.
Figure 9B:
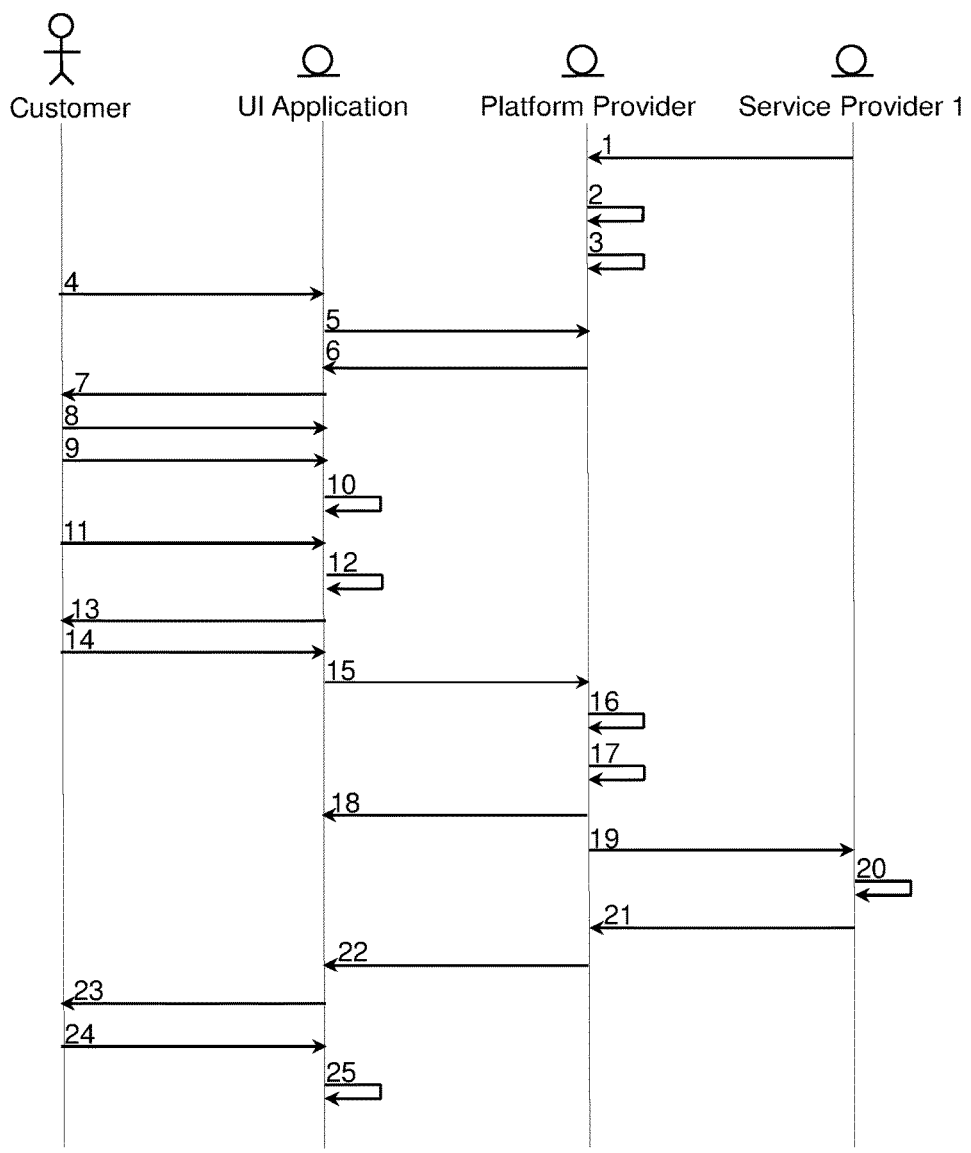
FIG. 9B is a sequence diagram illustrating the various steps performed in the example scenario.

FIG. 9A is a schematic illustration of an example scenario wherein a third party service provider provides a service "X" that a user wants to use for his/her customer network; and FIG. 9B is a sequence diagram illustrating the various steps performed in the example scenario.

At step 1, a Platform Provider (namely, an entity implementing the system pursuant to embodiments of the present disclosure) advertises "Service X" provided by Service Provider 1 (namely, the third party service provider). At step 2, the Platform Provider signs the "Service X". At step 3, the Platform Provider stores the "Service X" provided by the Service Provider 1.

At step 4, the user searches for the "Service X". At step 5, a User Interface (UI) Application searches for the "Service X". At step 6, the Platform Provider lists the "Service X" provided by the Service Provider 1 to the UI Application. At step 7, the UI Application displays the "Service X" provided by the Service Provider 1 to the user.

At step 8, the user configures order for the customer network to the UI Application. At step 9, the user orders the "Service X" provided by the Service Provider 1. At step 10, the UI Application requests cryptographic signature. At step 11, the user optionally unlocks private key. At step 12, the UI Application signs the order and new configuration. At step 13, the UI Application optionally requests payment from the user. At step 14, the user optionally pays the UI Application for the order. At step 15, the UI Application optionally delivers signed order with optional payment information to the Platform Provider.

At step 16, the Platform Provider verifies the cryptographic signature. At step 17, the Platform Provider optionally verifies the payment received from the user via the UI Application. At step 18, the Platform Provider acknowledges receipt of the order to the UI Application. At step 19, the Platform Provider requests the Service Provider 1 for delivery of the order.

At step 20, the Service Provider 1 begins process of deploying configuration for the order. At step 21, the Service Provider 1 acknowledges delivery of the order to the Platform Provider. At step 22, the Platform Provider notifies the UI Application of completion of the order. At step 23, the UI Application verifies deployment to the user. At step 24, the user accepts deployment. At step 25, the UI Application begins the process of deploying the configuration.

FIGS. 9A and 9B are merely examples, which should not unduly limit the scope of the claims herein. A person skilled in the art will recognize many variations, alternatives, and modifications of embodiments of the present disclosure.

Figure 10:
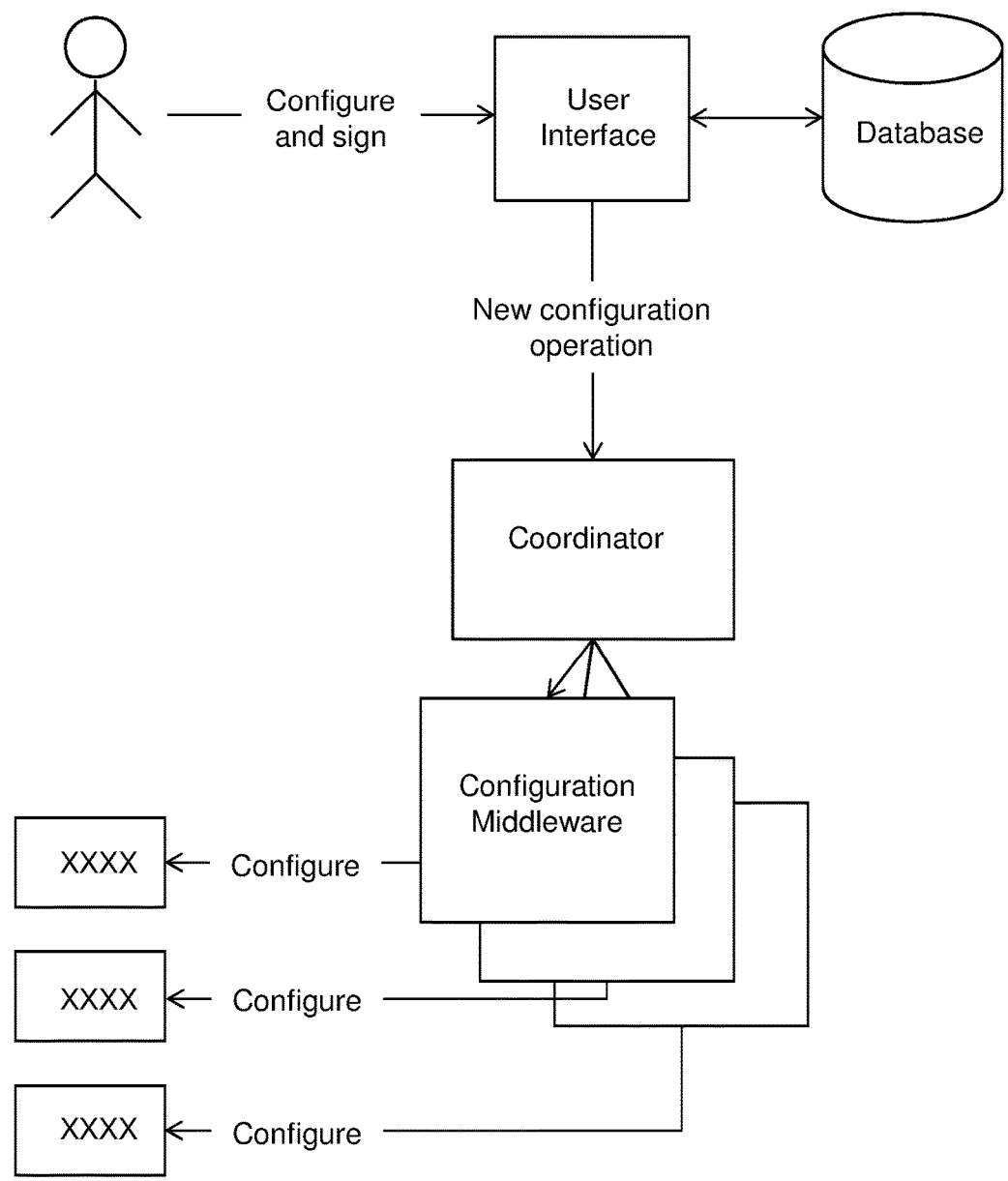
FIG. 10 is a schematic illustration of yet another example implementation of an automatic configuration translation mechanism provided by a system pursuant to embodiments of the present disclosure.

FIG. 10 is a schematic illustration of yet another example implementation of an automatic configuration translation mechanism provided by a system pursuant to embodiments of the present disclosure.

With reference to FIG. 10, a user provides a high-level configuration and optionally signs it, using a user interface provided by the system. The high-level configuration is translated to a mid-level configuration, which is then provided to a coordinator. The coordinator then provides the mid-level configuration to a middleware, which then translates the mid-level configuration into a low-level configuration and then configures target devices to achieve a target functionality defined by the user.

FIG. 10 is merely an example, which should not unduly limit the scope of the claims herein. A person skilled in the art will recognize many variations, alternatives, and modifications of embodiments of the present disclosure.

Figure 11:
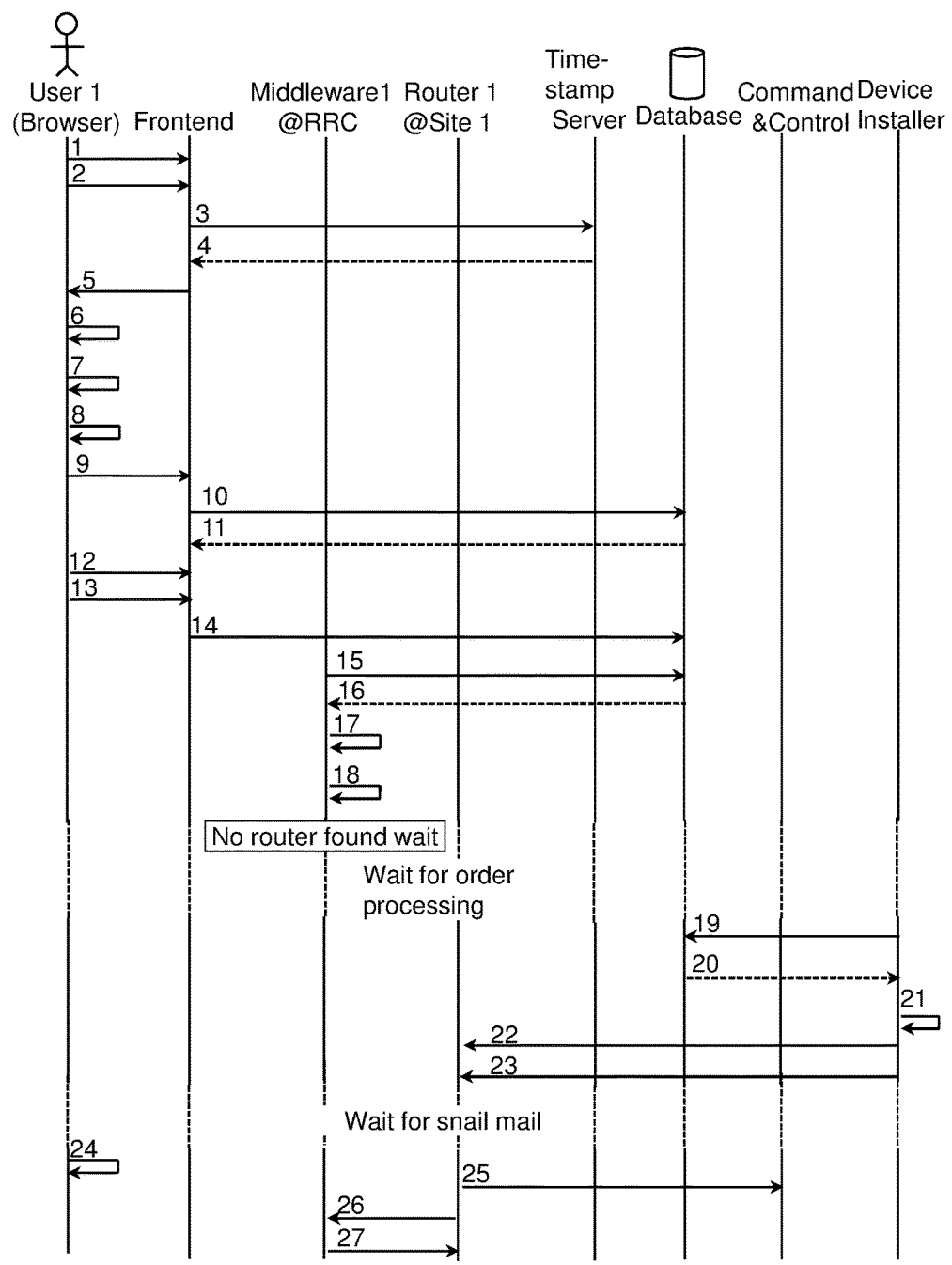
FIG. 11 is a sequence diagram illustrating various steps involved when a user places an order for a managed router via a user interface provided by the system pursuant to embodiments of the present disclosure.

FIG. 11 is a sequence diagram illustrating various steps involved when a user places an order for a managed router via a user interface provided by the system pursuant to embodiments of the present disclosure.

At step 1, the user 1 clicks to add a new router. At step 2, the user creates a configuration. At step 3, a frontend sends timestamp configurations to a timestamp server. At step 4, the timestamp server returns a timestamp signature to the frontend. At step 5, the frontend gives timestamp signature to the user 1. At step 6, the user 1 unlocks Private Key. At step 7, the user 1 signs the configuration and the timestamp signature. At step 8, the user 1 locks the Private Key. At step 9, the user 1 passes the final signed configuration to the frontend.

At step 10, the frontend saves the signed configuration at a database. At step 11, the database sends an acknowledgement (ACK) to the frontend.

At step 12, the user 1 clicks to order a new router. At step 13, the user 1 pays for the router online. At step 14, the frontend saves the order at the database.

At step 15, Middleware 1 fetches the configuration from the database. At step 16, the database transmits the configuration to the Middleware 1. At step 17, the Middleware 1 cryptographically verifies the configuration (using the User 1's Public Key). At step 18, the Middleware 1 applies the configuration. The Middleware 1 waits for processing order until a router is found.

At step 19, a device installer fetches the order from the database. At step 20, the database transmits the order to the device installer. At step 21, the device installer processes the order. At step 22, the device installer creates a device identity (for example, a Universally Unique Identifier (UUID) as provided in the order). At step 23, the device installer creates a base configuration (namely, a CC connection). At step 24, the user 1 connects the router to the network. At step 25, the router 1 opens a Command and Control connection. At step 26, the router 1 registers the Middleware 1. At step 27, the Middleware 1 configures the router 1.

FIG. 11 is merely an example, which should not unduly limit the scope of the claims herein. A person skilled in the art will recognize many variations, alternatives, and modifications of embodiments of the present disclosure.

Figure 12:
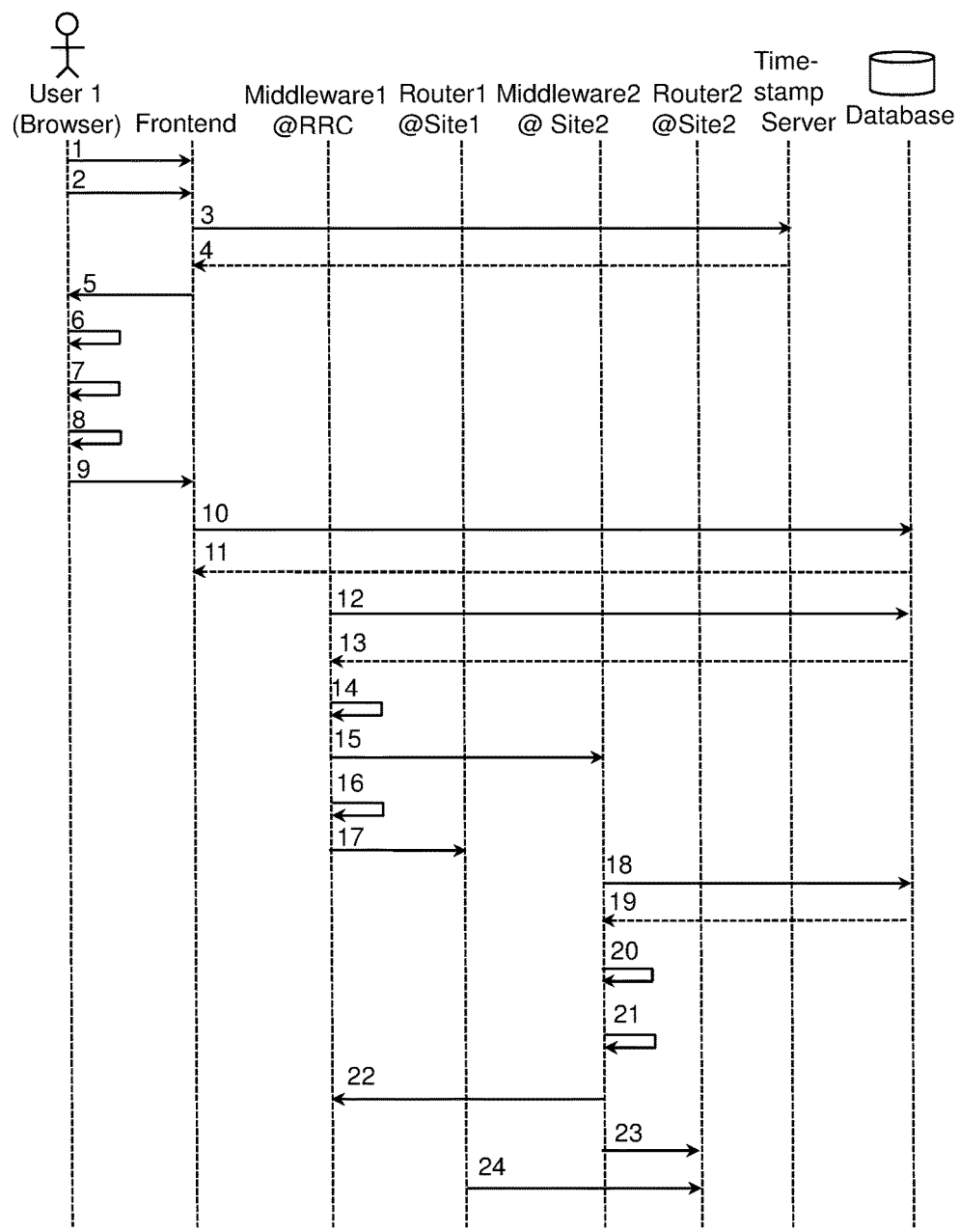
FIG. 12 is a sequence diagram illustrating various steps involved when a user configures a VPN connection between two managed routers via a user interface provided by the system pursuant to embodiments of the present disclosure.

FIG. 12 is a sequence diagram illustrating various steps involved when a user configures a VPN connection between two managed routers via a user interface provided by the system pursuant to embodiments of the present disclosure.

At step 1, a user 1 configures a VPN connection between a router 1 and a router 2, via the user interface. At step 2, the user 1 creates configurations at a frontend. At step 3, the frontend sends timestamp configurations to a timestamp server. At step 4, a timestamp signature is returned to the frontend by the timestamp server. At step 5, the frontend gives the timestamp signature to user 1. At step 6, the user 1 unlocks a private key. At step 7, the user 1 signs the configuration and the timestamp signature. At step 8, the user 1 locks the private key. At step 9, the user 1 passes the final signed configuration to the frontend.

At step 10, the frontend saves the signed configuration at a database. At step 11, the database sends an acknowledgement (ACK) to the frontend. At step 12, a Middleware 1 fetches the configuration from the database. At step 13, the database sends the configuration to the Middleware 1. At step 14, the Middleware 1 cryptographically verifies the configuration using a user's public key. At step 15, the Middleware 1 agrees a VPN shared secret with a Middleware 2, wherein the VPN shared secret is encrypted by Middleware 2's public key. At step 16, the Middleware 1 applies the configuration. At step 17, the Middleware 1 configures VPN. At step 18, the Middleware 2 fetches the configuration from the database. At step 19, the database sends the configuration to the Middleware 2. At step 20, the Middleware 2 cryptographically verifies the configuration using a user's public key. At step 21, the Middleware 2 applies the configuration.

At step 22, the Middleware 2 agrees VPN shared secret with the Middleware 1, wherein the VPN shared secret is encrypted by Middleware 1 public key. At step 23, the Middleware 2 configures the VPN. At step 24, the router 1 starts the VPN connection with the router 2.

FIG. 12 is merely an example, which should not unduly limit the scope of the claims herein. A person skilled in the art will recognize many variations, alternatives, and modifications of embodiments of the present disclosure. Note: a notation "@" in texts: "Middleware1@RRC", "Middleware2@RRC", "Router1@site1", "Router2@site2", refer to logical or physical location of Middleware1, Middleware2, Router1, Router2 to be at RRC, site1 or site 2 respectively in FIG. 11 and FIG. 12.

Figure 13:
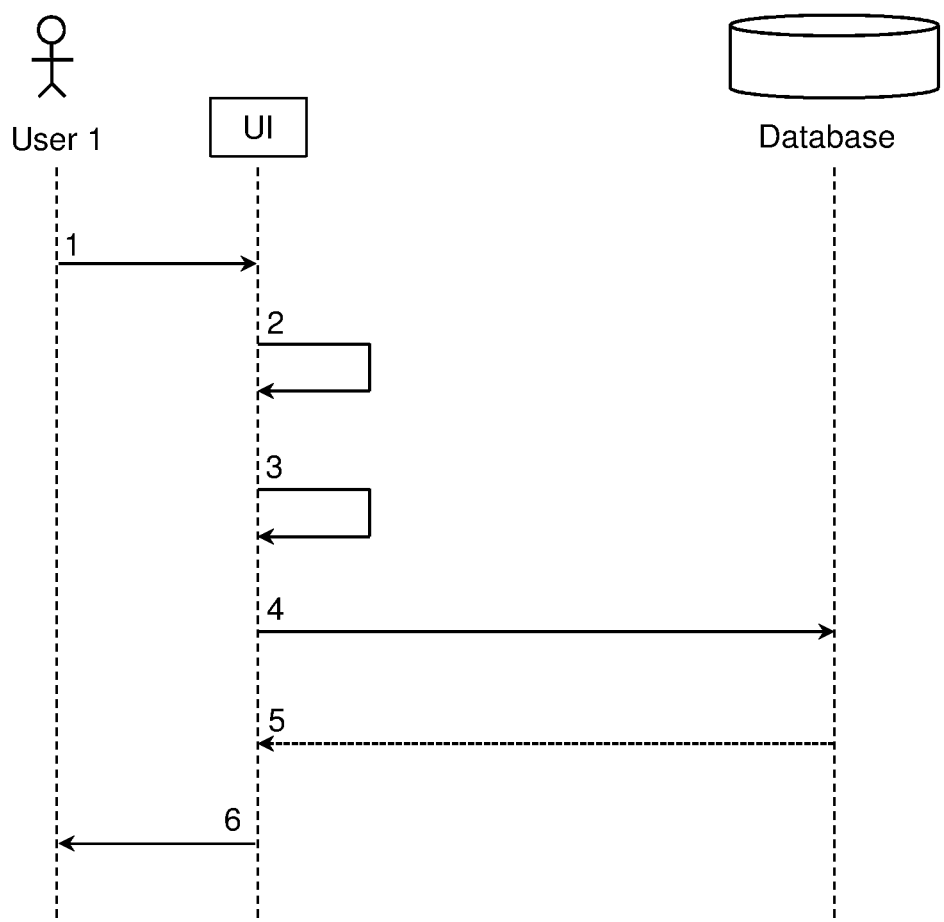
FIG. 13 is a sequence diagram illustrating various steps involved when a user logs-in to use a user interface provided by the system pursuant to embodiments of the present disclosure.

FIG. 13 is a sequence diagram illustrating various steps involved when a user logs-in to use a user interface provided by the system pursuant to embodiments of the present disclosure.

At step 1, user 1 logs in to the User Interface (UI). At step 2, the UI prepares a login sequence. At step 3, the UI prepares a Private Key unlock sequence.

At step 4, the UI fetches high-level configurations from a database. At step 5, the database transmits the high-level configurations to the UI. At step 6, the UI is displayed to the user 1.

FIG. 13 is merely an example, which should not unduly limit the scope of the claims herein. A person skilled in the art will recognize many variations, alternatives, and modifications of embodiments of the present disclosure.

Figure 14:
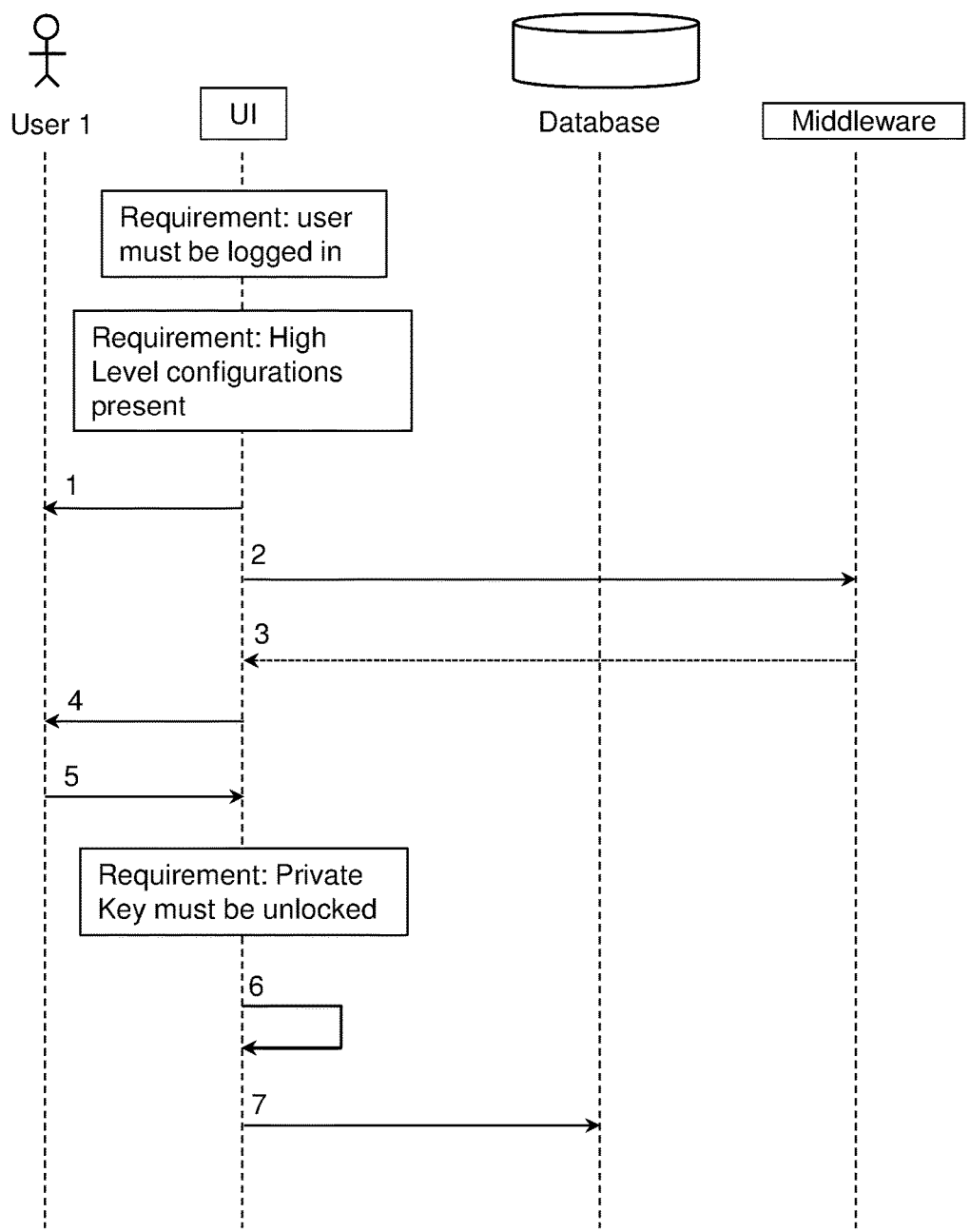
FIG. 14 is a sequence diagram illustrating various steps involved when a user makes modifications to a current high-level configuration presented on a user interface provided by the system pursuant to embodiments of the present disclosure.

FIG. 14 is a sequence diagram illustrating various steps involved when a user makes modifications to a current high-level configuration presented on a user interface provided by the system pursuant to embodiments of the present disclosure.

It is required that the user 1 is logged-in and high-level configurations are present. At step 1, the UI shows the current high-level configuration to the user 1.

At step 2, the UI optionally begins status tracking from a Middleware. At step 3, the Middleware optionally transmits status data to the UI. At step 4, the UI optionally shows the status data to the user 1.

At step 5, the user 1 modifies the high-level configuration using the UI. As shown, the UI requires that the user's private key is unlocked. At step 6, the UI signs the modified high-level configuration. At step 7, the UI saves the signed high-level configuration at the database.

FIG. 14 is merely an example, which should not unduly limit the scope of the claims herein. A person skilled in the art will recognize many variations, alternatives, and modifications of embodiments of the present disclosure.

Figure 15:
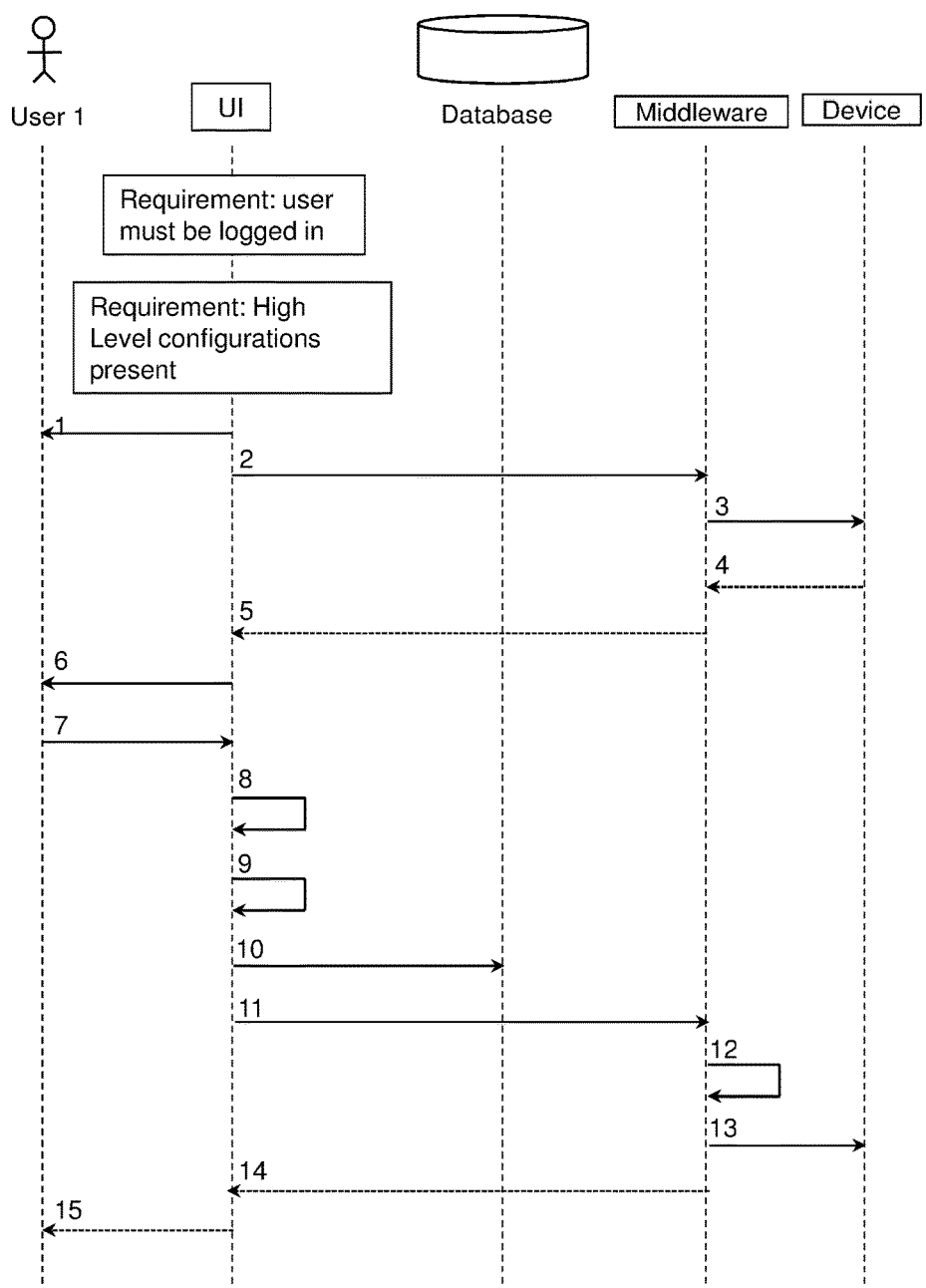
FIG. 15 is a sequence diagram illustrating various steps involved when a user verifies deployment of a mid-level configuration to managed network devices, via a user interface provided by the system pursuant to embodiments of the present disclosure.

FIG. 15 is a sequence diagram illustrating various steps involved when a user verifies deployment of a mid-level configuration to managed network devices, via a user interface provided by the system pursuant to embodiments of the present disclosure.

It is required that the user 1 is logged-in and high-level configurations are present. At step 1, the UI shows the current configuration to the user 1. At step 2, the UI begins status tracking from a Middleware. At step 3, the Middleware requests device to get status data. At step 4, the device transmits the status data to the Middleware. At step 5, the Middleware transmits the status data to the UI.

At step 6, the UI shows the status data to the user 1. At step 7, the user 1 verifies deployment of the configuration using the UI. At step 8, the UI generates a mid-level configuration from the high-level configuration. At step 9, the UI signs the mid-level configuration. At step 10, the UI saves the mid-level configuration at a database. At step 11, the UI sends the mid-level configuration to the Middleware. At step 12, the Middleware verifies the mid-level configuration. At step 13, the Middleware configures the device. At step 14, the Middleware transmits status data (of the device) to the UI. At step 15, the UI shows the status data to the user 1.

FIG. 15 is merely an example, which should not unduly limit the scope of the claims herein. A person skilled in the art will recognize many variations, alternatives, and modifications of embodiments of the present disclosure.

Figure 16:
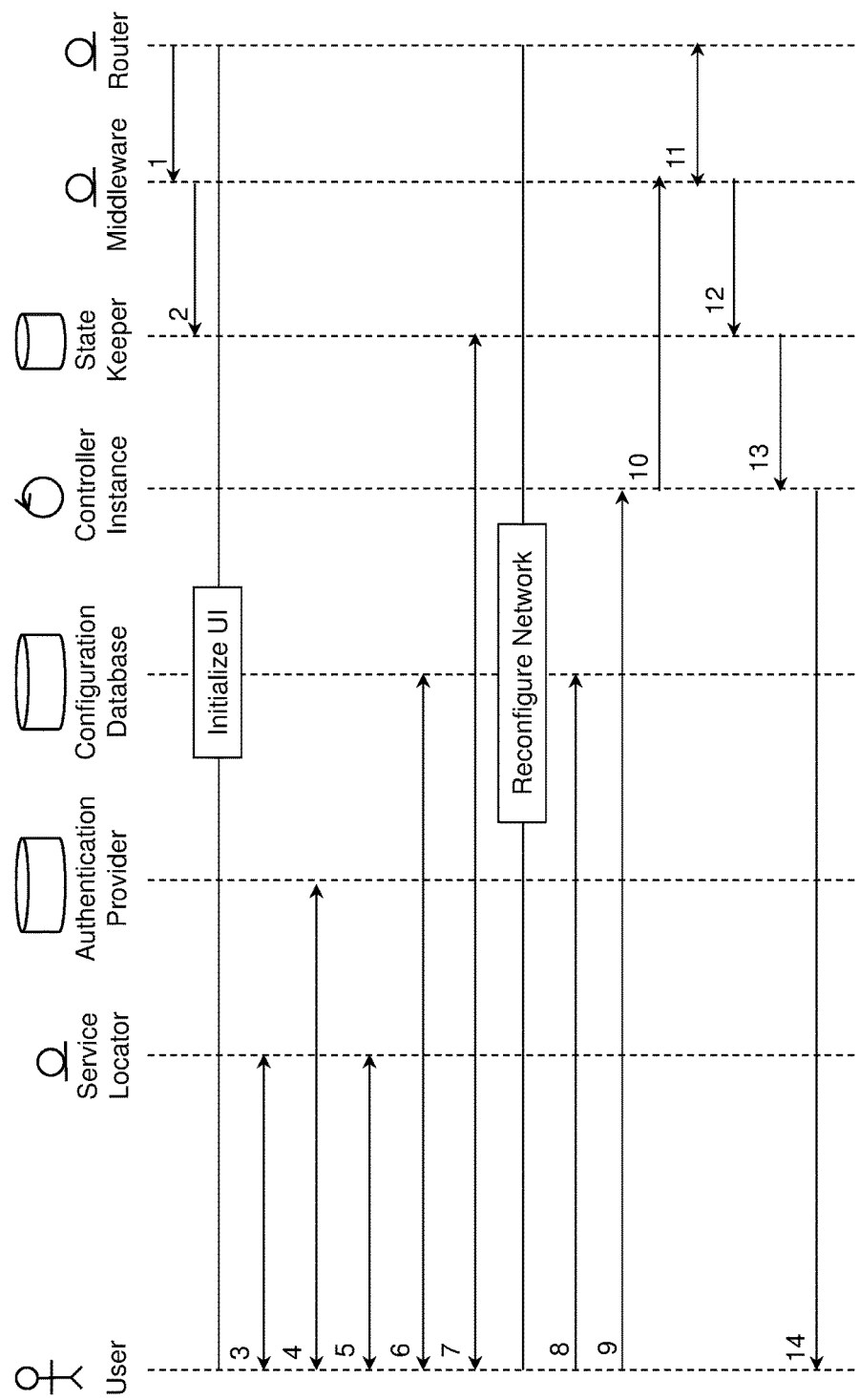
FIG. 16 is a sequence diagram illustrating various steps involved when a user makes changes to the current high-level configuration, via a user interface provided by the system pursuant to embodiments of the present disclosure.

FIG. 16 is a sequence diagram illustrating various steps involved when a user makes changes to the current high-level configuration, via a user interface provided by the system pursuant to embodiments of the present disclosure.

At step 1, a router sends device status updates to a Middleware. At step 2, the Middleware sends network status updates to a state keeper. Thereafter, a user interface (UI) is initialized. At step 3, the user finds authenticator and receives information thereof, via a service locator. At step 4, an authentication provider authenticates the user and the user gets a token. At step 5, the user finds a configuration database and the state keeper via the service locator. At step 6, the user fetches network configuration from configuration database. At step 7, the user fetches device status and graphs from the state keeper. Thereafter, the network is reconfigured.

At step 8, the user stores the modified configuration at the configuration database. At step 9, the user provisions a new configuration using controller instance. At step 10, the controller instance sends the new configuration to the Middleware. At step 11, the Middleware configures a router. At step 12, the Middleware updates status at the state keeper. At step 13, the state keeper updates status at the controller instance. At step 14, the state keeper updates status to the user.

FIG. 16 is merely an example, which should not unduly limit the scope of the claims herein. A person skilled in the art will recognize many variations, alternatives, and modifications of embodiments of the present disclosure.

FIGS. 17A-D are example views of a user interface provided by the method and system pursuant to embodiments of the present disclosure. FIGS. 17A-D are various exemplary graphical and symbolic views (or dashboards) that are presented to the user via the user interface.

Figure 17A:
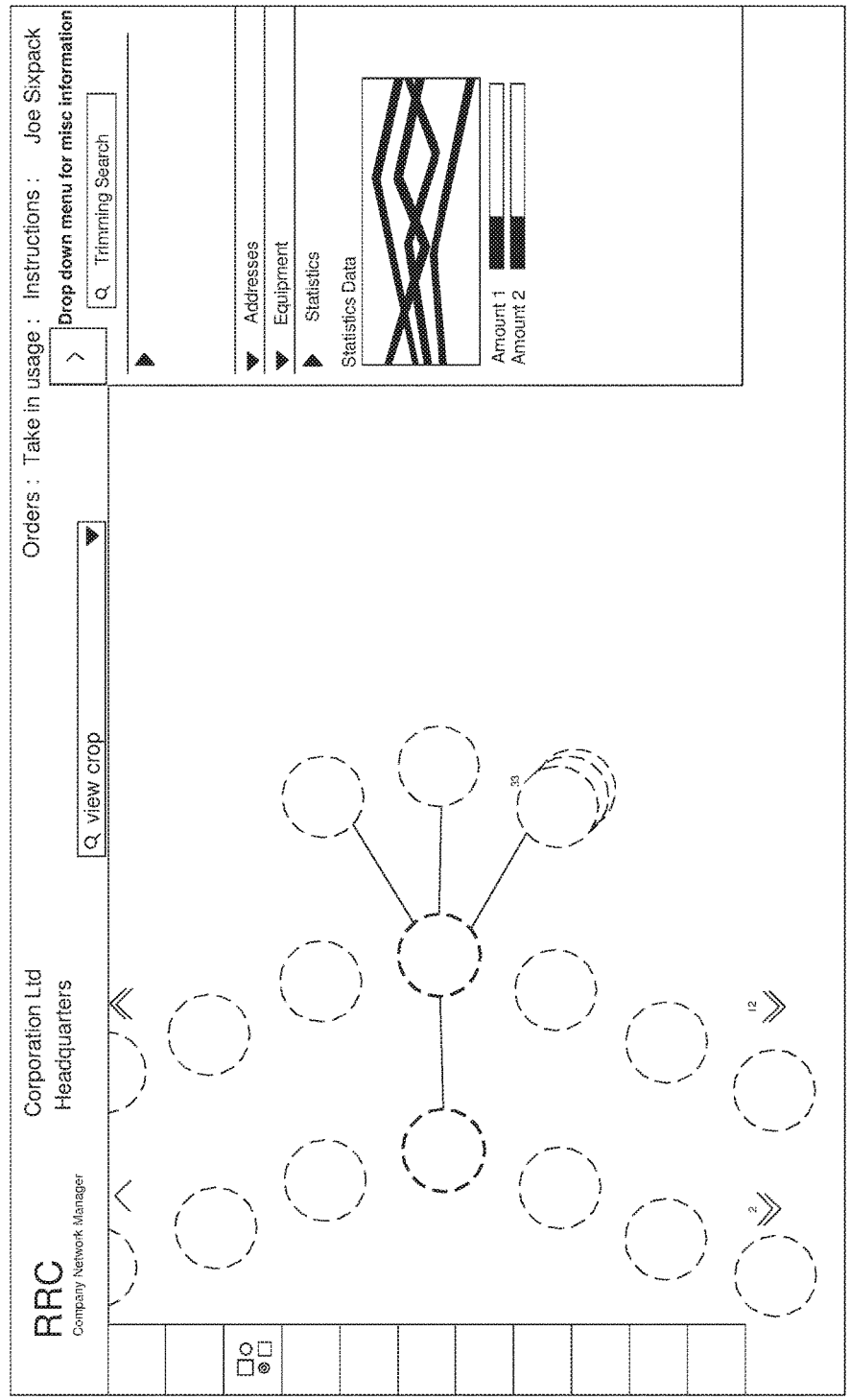
FIGS. 17A-D are example views of a user interface provided by the method and system pursuant to embodiments of the present disclosure.

In FIG. 17A, the graphical user interface shows information related to a customer network whose network configuration is being managed. The customer network comprises a plurality of devices, some of which are inter-connected. The graphical user interface also depicts information specific to the network, for example, network address, network equipment, statistical data and so forth. The graphical user interface may also depict information specific to the devices present in the network. The graphical user interface may also include tabs for dropdown menu for miscellaneous information and searches.

Figure 17B:
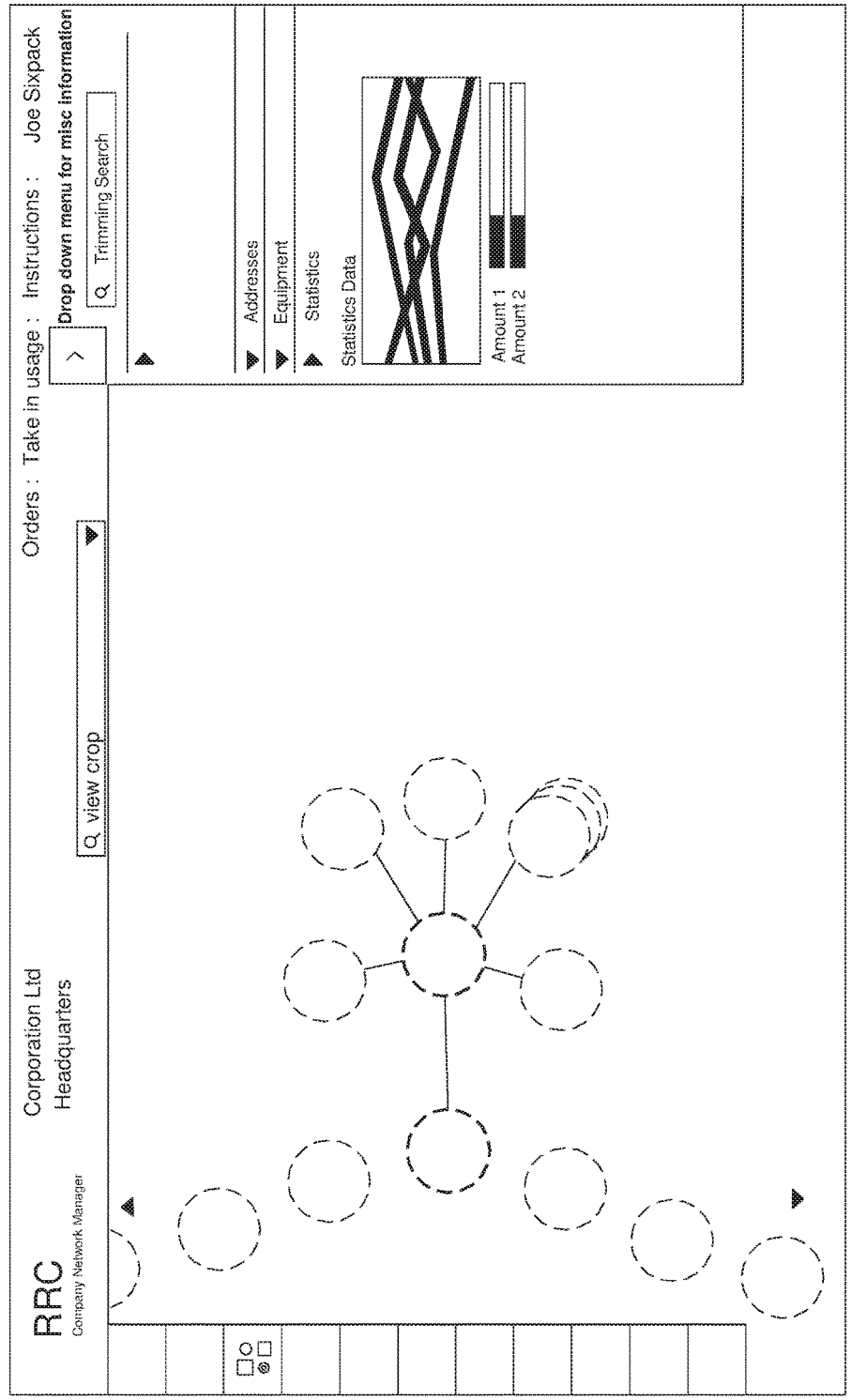

In FIG. 17B, the graphical user interface depicts a change of a change made by the user, wherein new devices are added to the network.

Figure 17C:
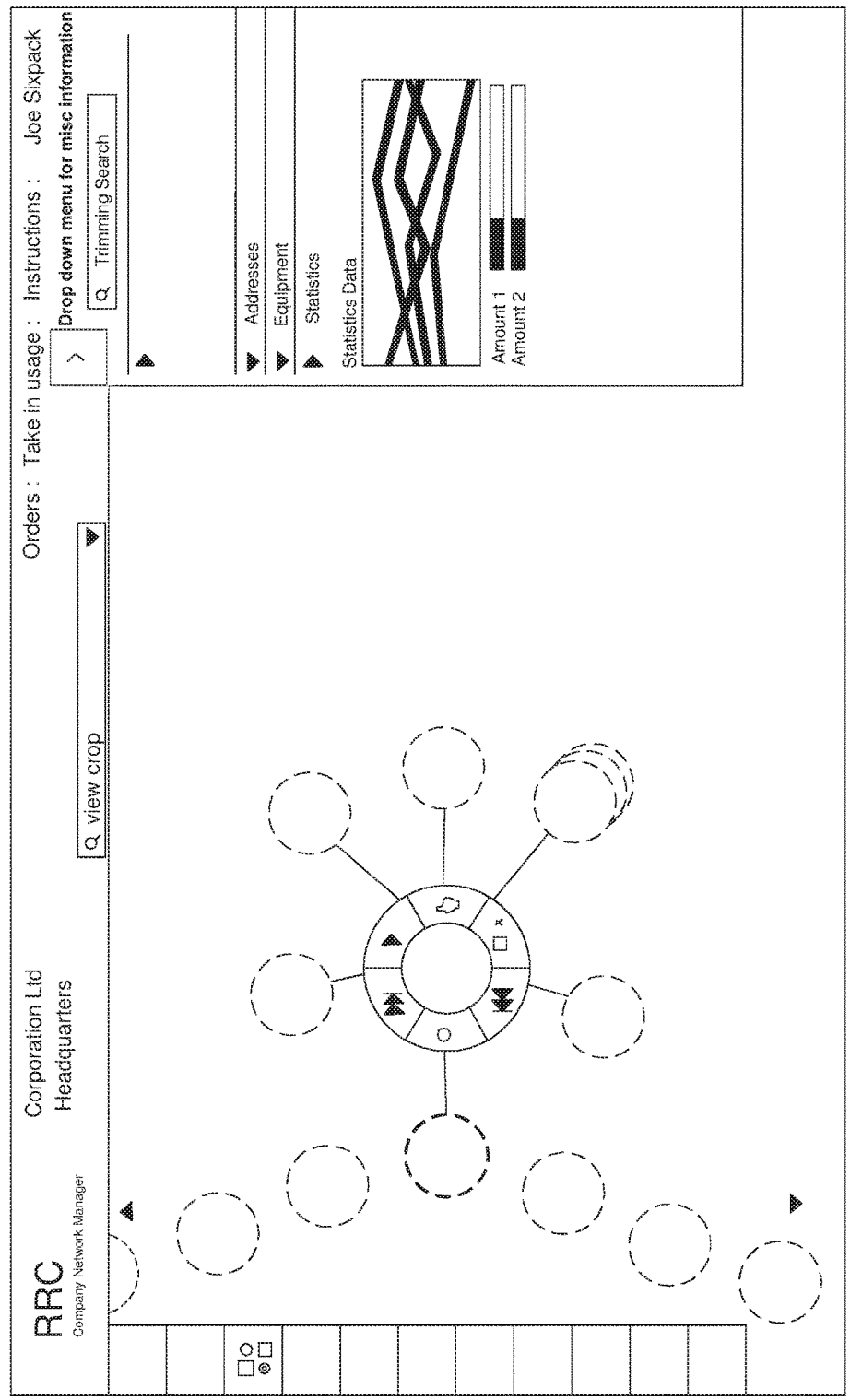

In FIG. 17C, the graphical user interface depicts a device-managing icon, having a plurality of buttons operable to be used to change a device's configuration. For example, the plurality of buttons may be operable to manage a device, for example, by performing activation or deactivation of its functionalities and so forth.

Figure 17D:
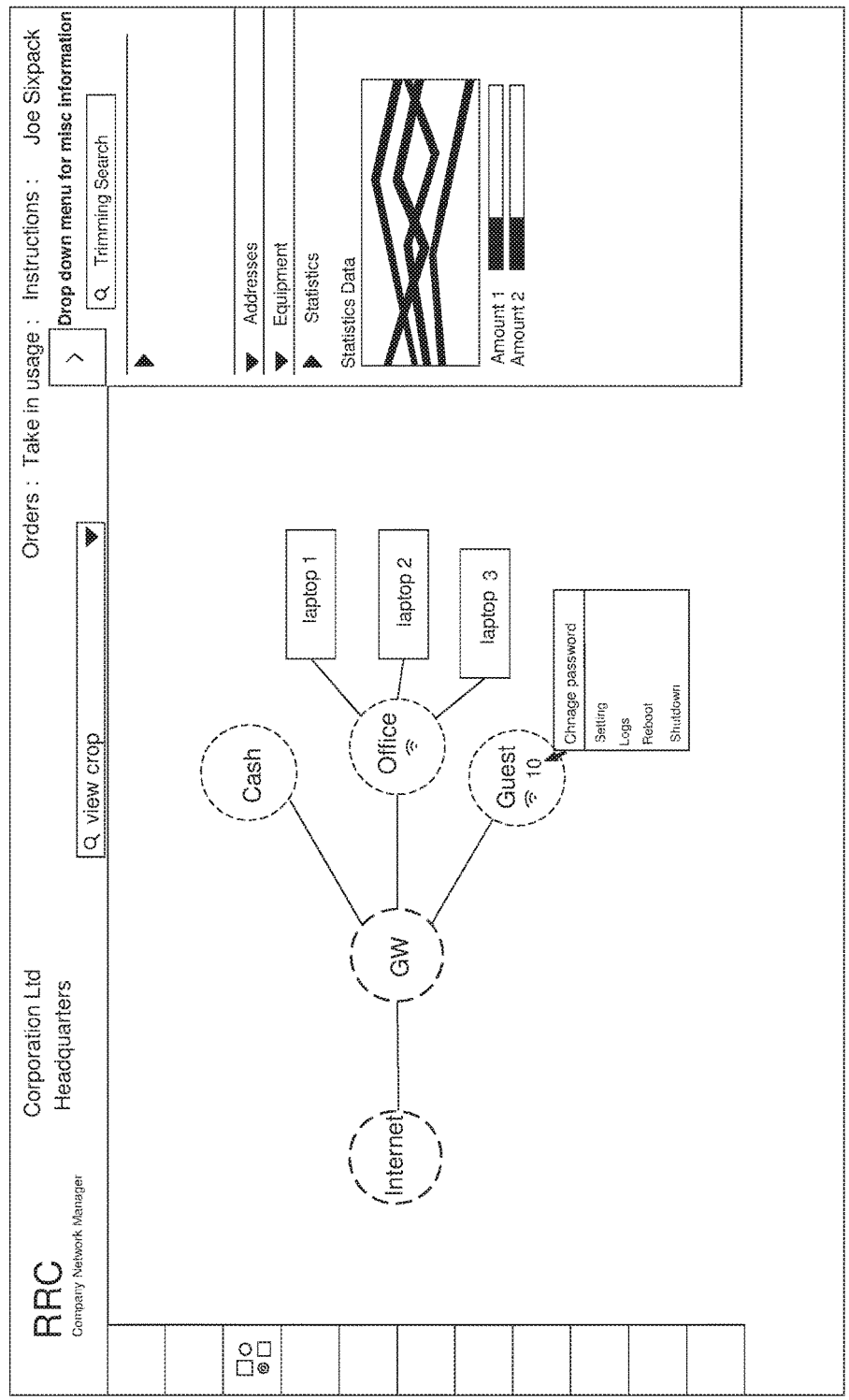

In FIG. 17D, the graphical user interface depicts detail information associated with the customer network. As shown, the graphical user interface depicts various levels of the customer network, such as the Internet, gateway and routers (for example, such as office and guest). Further, the network is shown to include end user computing devices (for example, such as laptops) coupled to the routers. Also, the graphical user interface depicts a device-configuration menu, having a plurality of tabs operable to alter the device's configuration. As shown, when a pointer is hovered over a guest router, the device-configuration menu shows tabs for changing password, viewing settings and logs, and performing a reboot or a shutdown.

FIGS. 17A-D are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of configuring a given communication network, the method comprising:
   (a) storing network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;

(b) providing a user interface to enable a user to make a change in the current network configuration of the given communication network;

(c) receiving, via the user interface, a user input defining a target functionality to be achieved for at least one device of the given communication network in a generic, device-independent form, wherein the target functionality is defined by the user in a form of a high-level configuration, which is then processed into a form of a mid-level configuration, which is further processed into a form of a low-level configuration;

(d) translating the user input from the generic, device-independent form into a device-specific form to determine at least one change to be made in the current network configuration;

(e) analyzing the at least one change to be made in the current network configuration, whilst taking into account the network-access information associated with the current network configuration, to determine an impact of the at least one change on the network connections between the devices of the given communication network;

(f) providing the user with information indicative of the impact of the at least one change on the network connections between the devices of the given communication network and other devices outside of the given communication network, via the user interface; and (g) verifying the at least one change with the user, via the user interface, thereby enabling the user to accept or reject the at least one change to be made in the current network configuration.

2. The method of claim 1, wherein the providing at (f) comprises simulating the impact of the at least one change individually on each of the network connections between the devices of the given communication network.

3. The method of claim 2, wherein the network-access information further comprises information about network connections between the devices of the given communication network and other devices outside the given communication network, and wherein the providing at (f) further comprises simulating the impact of the at least one change on the network connections between the devices of the given communication network and the other devices outside the given communication network.

4. The method of claim 1, wherein the user interface comprises a graphical and symbolic user interface, and wherein the providing at (f) comprises displaying to the user at least one visualization of the impact of the at least one change on the network connections, via the graphical and symbolic user interface.

5. The method of claim 1, wherein the at least one change comprises a plurality of changes to be made in the current network configuration, and wherein the method further comprises determining an order in which the plurality of changes are to be deployed, so as to avoid an occurrence of a non-functional state of the given communication network; and deploying the plurality of changes in the determined order.

6. The method of claim 1, wherein the network-access information is stored at (a) along with associated timestamps.

7. The method of claim 1, wherein the user input is received in an encrypted form.

8. The method of claim 1 further comprising authenticating and authorizing the user prior to performing (b) to (g).

9. A system for configuring a given communication network, the system comprising:
a server arrangement; and
a database arrangement coupled in communication with the server arrangement,
wherein the server arrangement is operable to:

(a) store, at the database arrangement, network-access information associated with at least one network configuration of the given communication network, the network-access information comprising information about network connections between devices of the given communication network that are allowed when the at least one network configuration is being implemented in the given communication network, the at least one network configuration comprising a current network configuration of the given communication network;

(b) provide a user interface to enable a user to make a change in the current network configuration of the given communication network;

(c) receive, via the user interface, a user input defining a target functionality to be achieved for at least one device of the given communication network in a generic, device-independent form, wherein the target functionality is defined by the user in a form of a high-level configuration, which is then processed into a form of a mid-level configuration, which is further processed into a form of a low-level configuration;

(d) translate the user input from the generic, device-independent form into a device-specific form to determine at least one change to be made in the current network configuration;

(e) analyze the at least one change to be made in the current network configuration, whilst taking into account the network-access information associated with the current network configuration, to determine an impact of the at least one change on the network connections between the devices of the given communication network;

(f) provide the user with information indicative of the impact of the at least one change on the network connections between the devices of the given communication network, via the user interface; and (g) verify the at least one change with the user, via the user interface, thereby enabling the user to accept or reject the at least one change to be made in the current network configuration.

10. The system of claim 9, wherein when providing at (f), the server arrangement is operable to simulate the impact of the at least one change individually on each of the network connections between the devices of the given communication network.

11. The system of claim 10, wherein the network-access information further comprises information about network connections between the devices of the given communication network and other devices outside the given communication network, and wherein, when providing at (f), the server arrangement is operable to simulate the impact of the at least one change on the network connections between the devices of the given communication network and the other devices outside the given communication network.

12. The system of claim 9, wherein the user interface comprises a graphical and symbolic user interface, and wherein, when providing at (f), the server arrangement is operable to display to the user at least one visualization of the impact of the at least one change on the network connections, via the graphical and symbolic user interface.

13. The system of claim 9, wherein the at least one change comprises a plurality of changes to be made in the current network configuration, and wherein the server arrangement is operable to determine an order in which the plurality of changes are to be deployed, so as to avoid an occurrence of a non-functional state of the given communication network; and to deploy the plurality of changes in the determined order.

14. The system of claim 9, wherein the server arrangement is operable to store the network-access information along with associated timestamps at the database arrangement.

15. The system of claim 9, wherein the server arrangement is operable to receive the user input in an encrypted form.

16. The system of claim 9, wherein the server arrangement is operable to authenticate and authorize the user prior to performing (b) to (g).

* * * * *